United States Patent
Goto et al.

(10) Patent No.: US 7,614,752 B2
(45) Date of Patent: Nov. 10, 2009

(54) IMAGE DISPLAY APPARATUS AND METHOD, AND DRIVING APPARATUS AND METHOD

(75) Inventors: Satoshi Goto, Tokyo (JP); Hiroshi Masaki, Kanagawa (JP); Izushi Kobayashi, Tokyo (JP); Norio Nishida, Kanagawa (JP); Toru Suzuki, Chiba (JP); Fumiyasu Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 671 days.

(21) Appl. No.: 11/264,143

(22) Filed: Nov. 2, 2005

(65) Prior Publication Data

US 2006/0098172 A1    May 11, 2006

(30) Foreign Application Priority Data

Nov. 10, 2004   (JP)   ............................. 2004-326408

(51) Int. Cl.
G03B 21/28    (2006.01)
G02B 26/10    (2006.01)

(52) U.S. Cl. .................. 353/50; 353/98; 359/205.1; 359/212.1; 359/215.1

(58) Field of Classification Search .............. 353/46, 353/50, 51, 98; 359/197, 201, 212, 214, 359/215, 221, 223, 225, 197.1, 205.1, 212.1, 359/214.1, 215.1, 223.1
See application file for complete search history.

(56) References Cited

U.S. PATENT DOCUMENTS 5,311,360 A    5/1994  Bloom et al.
6,018,408 A *  1/2000  Hong .................... 359/201
6,903,857 B2 * 6/2005  Sakai .................... 359/212
7,042,627 B2 * 5/2006  Maeyama et al. ........... 359/298

FOREIGN PATENT DOCUMENTS

| JP | 2003-066363 A | 3/2003 |
| JP | 2004-004256 | 1/2004 |
| JP | 2004-157522 | 6/2004 |
| WO | WO-2004/004167 | 1/2004 |

OTHER PUBLICATIONS

Japanese Office Action issued Jun. 4, 2009 for corresponding Japanese Application No. 2004-326408.

* cited by examiner

*Primary Examiner*—William C Dowling
(74) *Attorney, Agent, or Firm*—Rader, Fishman & Grauer PLLC

(57) ABSTRACT

The present invention provides an image display apparatus including a spatial light modulating element formed with a plurality of light modulating elements for each modulating light from a light source and arranged in a row or a plurality of rows, a projection optical system for forming a first image on a basis of the light modulated by the spatial light modulating element, light deflecting means for forming a second image by reflecting the first image formed by the projection optical system so as to scan the first image in a direction orthogonal to a longitudinal direction of the first image, which is a longer direction of the first image, a magnifying and projecting system for magnifying the second image and projecting the second image on a screen, and detecting means for detecting intensity of the light modulated by the spatial light modulating element and reflected by the light deflecting means via the projection optical system, the detecting means being disposed at a position that the light reflected from the light deflecting means enters without passing through the magnifying and projecting system, the position being off an optical path of the light going from the light deflecting means to the magnifying and projecting system.

14 Claims, 20 Drawing Sheets

IMAGE DISPLAY APPARATUS AND METHOD, AND DRIVING APPARATUS AND METHOD

CROSS REFERENCES TO RELATED APPLICATIONS

The present invention contains subject matter related to Japanese Patent Application JP 2004-326408 filed in the Japanese Patent Office on Nov. 10, 2004, the entire contents of which being incorporated herein by reference.

BACKGROUND OF THE INVENTION

The present invention relates to an image display apparatus and an image display method, and a driving apparatus and a driving method, and particularly to an image display apparatus and an image display method, and a driving apparatus and a driving method that make it possible to display an image using a display element and measure the modulation characteristics of the display element efficiently.

In recent years high resolution is increasingly required in for example introducing a new broadcasting system, increasing an image processing speed with an advance of an arithmetic operation device, and converting a mode in related art of projecting an image in a magnified form using a film (so-called analog cinema) to a mode utilizing digital signal processing (digital cinema). It is difficult for two-dimensional display elements such as a liquid crystal light valve and the like to keep pace with such a tendency for higher resolution because of drawbacks of the two-dimensional display devices result from an increase in the number of pixels and a reduction in pixel size.

For example, when resolution is to be heightened by increasing the (total) number of pixels while fixing the size of a display element, the opening portion of a display part cannot help being reduced in size, so that brightness is sacrificed (it is difficult to realize a bright projector apparatus). On the other hand, when resolution is to be heightened while pixel size is fixed, a drawback occurs in that the size of the display element is inevitably increased, thus resulting in an increase in size and cost of an apparatus including an optical system.

Incidentally, a reduction in pixel size requires a measure to prevent smaller foreign substances from being mixed into the display element in a process of manufacturing the display element. An increase in size of the display device requires an increase in size of a manufacturing apparatus itself.

Thus, when an arrangement in which scanning is performed in a predetermined direction using a one-dimensional display element, it is possible to greatly reduce the number of pixels arranged in the element.

As an example, a high-resolution television or a high-definition television, that is, a so-called HDTV (High Definition TeleVision) using a two-dimensional display element requires a number of elements corresponding to 1920×1080≈2.07 million pixels, whereas a system that performs scanning in a horizontal (H) direction using a one-dimensional display element can be realized with a number of elements corresponding to 1080 pixels. Therefore the superiority of the latter is obvious.

Accordingly, a technique for achieving higher resolution using a one-dimensional display element is proposed (for example, see Japanese Patent Laid-open No. 2004-4256, hereinafter Patent Document 1).

According to Patent Document 1, an image is formed by a two-dimensional image forming apparatus (an image display apparatus forming a two-dimensional image from a one-dimensional image) 1 including a light scanning apparatus 1a as shown in FIG. 1.

The light scanning apparatus 1a has a one-dimensional display element 2, a projection optical system 3, and light deflecting means (or a light deflecting apparatus) 4.

The one-dimensional display element 2 is formed by arranging a plurality of light emitting parts or light modulating parts along one direction. The one-dimensional display element 2 is formed by a one-dimensional light emitting display element in which a plurality of light emitting parts are arranged in a line form, or a one-dimensional light modulating element in which a plurality of light modulating parts are arranged in a line form, for example.

A GLV (Grating Light Valve) made by Silicon Light Machines of the U.S., for example, is known as the one-dimensional light modulating element (spatial light modulating element) (see U.S. Pat. No. 5,311,360). This GLV is formed by a phase reflection type diffraction grating formed by making full use of MEMS (Micro ElectroMechanical System) technology. Since the phase reflection type diffraction grating typified by the GLV does not emit light by itself, a light source is necessary (a coherent light source is desirable).

The projection optical system 3 forms a projected image by reflecting light incident from the one-dimensional display element 2, and is a reflection type one-dimensional projection optical system. For example, an Offner optical system disclosed in U.S. Pat. No. 3,748,015 is exemplified as a basic system for unmagnification projection, and reflection is performed three times in this system. That is, the Offner optical system is formed by using a pair of reflectors so that a first reflection and a third reflection are performed on a curved surface having the same center and the same radius of curvature and a second reflection is performed on a different surface.

The light deflecting means 4 is provided to form a two-dimensional image by scanning the light from the projection optical system 3. That is, the light deflecting means 4 provides the two-dimensional image by scanning the outgoing light, which is obtained after the light is reflected by the projection optical system 3 three times or more, in a plane including a direction orthogonal to a direction of arrangement of the light emitting parts or the light modulating parts in the one-dimensional display element 2. A rotary reflector (such as a galvanomirror or the like), for example, is cited as the light deflecting means 4.

The two-dimensional image obtained through the light deflecting means 4 is magnified through a magnifying and projecting system 5, and then projected onto a screen 6. That is, the magnifying and projecting system 5 is an optical system for magnifying and projecting the two-dimensional image obtained by the projection optical system 3 and the light deflecting means 4 using the two-dimensional image as an intermediate image.

Thus, the two-dimensional image is obtained by scanning by the light deflecting means 4 (scanning the light in the direction orthogonal to the direction of arrangement of the light emitting parts or the light modulating parts in the one-dimensional display element 2) in a stage preceding the magnifying and projecting system 5.

Incidentally, the use of the one-dimensional display element having a plurality of light modulating parts arranged in one direction requires a light source for irradiating the one-dimensional display element with light. The two-dimensional image can be obtained by reflecting the light three times or more which light is applied from the light source to the one-dimensional display element and thereafter enters the projection optical system 3, and then scanning the light by the light deflecting means 4 in a plane including a direction orthogonal to a direction of arrangement of the light modulating parts in the one-dimensional display element.

FIG. 2 and FIG. 3 are diagrams of assistance in explaining operating principles of a GLV element as an example of the one-dimensional display element. In FIG. 2, an arrow "I" directed to a substrate 8 shows a direction of incident light, and an arrow "R" going away from the substrate 8 shows a direction of reflected light. In FIG. 3, an arrow "I" directed to the substrate 8 shows an incident direction, an arrow "D+1" shows a direction of +1st order diffracted light, and an arrow "D−1" shows a direction of −1st order diffracted light.

A reflection grating type element has a structure in which a large number of movable gratings 9 (referred to also as ribbon electrodes) and fixed gratings 10 are arranged in a predetermined direction on the substrate 8. Reflective films are formed on the respective surfaces of the movable gratings 9 and the fixed gratings 10 arranged alternately. That is, the movable gratings 9 are arranged as flexible beams (micro bridges) and elastically supported on the substrate, the reflective films 9a are formed on the surfaces of the movable gratings 9, and the reflection films 10a are formed on the fixed gratings 10.

An electrode layer 8b is formed on a surface of the substrate 8 opposite from a surface 8a above which the movable gratings 9 and the fixed gratings 10 are disposed.

In a state in which no potential difference is applied between the movable gratings 9 and the electrode layer 8b, as shown in FIG. 2, the height of the movable gratings 9 is equal to the height of the fixed gratings 10, and thus the heights of the reflective surfaces of the movable gratings 9 and the fixed gratings 10 (distances from the substrate 8) coincide with each other. Therefore no diffracting action occurs. Accordingly, wavefronts Wi, which are shown by broken lines in parallel with the surface 8a, of light incident from the I-direction are reflected in the R-direction as regularly reflected light, that is, as 0th order light.

When a voltage is applied between the movable gratings 9 and the electrode layer 8b, the movable gratings 9 are bent and drawn toward the substrate 8 side by electrostatic attraction, so that an optical path difference can be changed. That is, as shown in FIG. 3 in an exaggerated manner, a reflection and diffraction effect occurs when the potential difference is applied between the movable gratings 9 and the electrode layer 8b such that the depth of the gratings (the difference between the heights of the movable gratings 9 and the fixed gratings 10) is one fourth of a light wavelength $\lambda$ ($\lambda/4$), and the movable gratings 9 are thus made to come closer to the surface 8a of the substrate. The wavefronts Wi of the light incident from the I-direction are emitted as wavefronts Wd+ and Wd− (shown by broken lines whose intervals are shorter than those of the broken lines representing the wavefronts Wi in FIG. 3) of ±1st order diffracted light directed in directions "D+1" and "D−1."

Thus, regularly reflected light (0th order reflected light) can be obtained in a non-driven state in which no voltage is applied, and diffracted light (1st order diffracted light) can be obtained in a driven state in which a voltage is applied. Therefore light modulation can be performed by controlling these states in each pixel. That is, the phase reflection type diffraction grating can be obtained by controlling the depths of respective movable gratings, which correspond to respective pixels, in correspondence to an image signal.

When the phase reflection type diffraction grating such as the GLV element is used as the one-dimensional display element, it is desirable to dispose a Schlieren aperture for cutting off diffracted light of specific orders included in the diffracted light diffracted by the diffraction grating at a surface (reflection surface) forming the projection optical system 3. When an Offner optical system is employed as the projection optical system 3, for example, a Schlieren aperture can be disposed at a reflection surface for second reflection. Thereby an inexpensive two-dimensional image forming apparatus can be realized by reducing the number of constituent parts as a whole.

In practice, however, it is not easy for the image display apparatus providing 1080×1920 pixels obtained by scanning the GLV including 1080 pixel elements, for example, to achieve excellent image display in all the pixels. This is because it is generally difficult in device manufacturing to fabricate ribbon electrodes forming pixel elements with a uniform shape and a uniform surface state over the entire display area. Thus, projections or depressions on the order of nanometers occur even when the element is not operated. Therefore the GLV as a modulator varies modulation characteristics (driving voltage-modulated light luminance) among different pixel elements. As a result, nonuniformity in luminance appears on a screen, and a uniform black image cannot be obtained, for example.

Further, there are variations in the characteristic itself of a driving circuit provided for each pixel to adjust the gradation of luminance. Therefore it is not easy to make the modulation characteristics of pixel elements uniform. For example, an error of a driving signal for moving ribbon electrodes on the order of nanometers varies an amount of movement of movable ribbon electrodes in a GLV, and hence causes variations in the modulation characteristics of pixel elements. Such variations in the modulation characteristics are perceived as horizontal stripes in a unit of one to several pixels on a display screen, and thus cause deterioration in picture quality.

Accordingly, a technique of detecting nonuniformity of modulation characteristics of a modulation element in advance and correcting a driving signal or the like on the basis of the detected modulation characteristics is proposed (for example, see Japanese Patent Laid-Open No. 2004-157522, hereinafter called Patent Document 2).

According to Patent Document 2, an image display apparatus as shown in FIG. 4 displays an image or detects modulation characteristics. As shown in the figure, a green laser 51G and a blue laser 51B are arranged so as to emit laser light in directions parallel to a page surface of FIG. 4, while a red laser 51R is arranged such that red laser light thereof is orthogonal to the page surface of FIG. 4.

The sectional shape of the light beams from the red laser 51R, the green laser 51G, and the blue laser 51B is converted according to the shape of GLVs 53R, 53G, and 53B as a one-dimensional image element, and then the laser light is applied to the GLVs 53R, 53G, and 53B.

Line generator expanders 71, 75, and 76 each include two optical lenses, and form linear laser light to be applied to the GLVs 53R, 53G, and 53B disposed linearly.

The linear blue laser beam emitted from the line generator expander 71 is converged by a converging lens 73, deflected by a mirror 74, and then condensed on the GLV 53B. The linear green laser beam emitted from the line generator expander 76 is deflected by a mirror 78, converged by a converging lens 79, and then condensed on the GLV 53G. The linear red laser beam emitted from the line generator expander 75 is converged and deflected by a converging lens and a mirror not shown in the figure, and then condensed on the GLV 53R.

In the GLV 53R, the GLV 53G, and the GLV 53B having a function of a spatial modulator, each ribbon electrode of each pixel element is displaced according to a driving voltage applied thereto. The GLV 53R, the GLV 53G, and the GLV 53B thereby modulate the incident laser light, and emit modulated light including diffracted light of even-numbered orders such as 0th order light and ±2nd order light or diffracted light of odd-numbered orders such as ±1st order light and ±3rd order light. The diffracted light of the even-numbered orders or the odd-numbered orders advance in directions determined by the spatial periods of the GLV 53R, the GLV 53G, and the GLV 53B, that is, are spatially modulated by the GLV 53R, the GLV 53G, and the GLV 53B.

The emitted modulated light of the different colors is mixed by a color synthesis unit 54 to form laser light of a desired color. The color synthesis unit 54 includes a first color synthesis filter 54a and a second color synthesis filter 54b.

The red laser light modulated by the GLV 53R and the green laser light modulated by the GLV 53G are first subjected to color synthesis by the first color synthesis filter 54a. Then, the second color synthesis filter 54b synthesizes the blue laser light modulated by the GLV 53B with the laser light synthesized by the first color synthesis filter 54a.

The laser light synthesized by the second color synthesis filter 54b is applied to an Offner relay mirror 35a having a concave surface. The Offner relay mirror 35a having the concave surface reflects the applied light to a Schlieren filter 35b having a convex surface. The Schlieren filter 35b formed by a convex mirror is disposed on a Fourier plane of the concave Offner relay mirror 35a. A ratio of a radius of curvature of the Schlieren filter 35b to that of the concave Offner relay mirror 35a is 1:2. The 0th order light, the +2nd order light, and the −2nd order light, or the +1st order light and the −1st order light, and other diffracted light of higher orders reflected by the concave Offner relay mirror 35a are converged at respective different positions on the convex surface of the Schlieren filter 35b. The Schlieren filter 5b removes the diffracted light other than the ±1st order light, and introduces only the ±1st order light to a light diffusion unit 37.

The concave Offner relay mirror 35a reflects, to the convex Schlieren filter 35b, the laser light synthesized by the second color synthesis filter 54b at a reflection angle smaller than that of a reflecting mirror in the form of a flat plate. The convex Schlieren filter 35b reflects, to the Offner relay mirror 35a, the ±1st order light at a reflection angle greater than that of a reflecting mirror in the form of a flat plate. The concave Offner relay mirror 35a reflects, to a mirror 80, the ±1st order light at a reflection angle smaller than that of a reflecting mirror in the form of a flat plate.

The ±1st order light can be extracted without any aberration by the arrangement of the concave Offner relay mirror 35a and the convex Schlieren filter 35b.

The mirror 80 deflects the modulated light toward the light diffusion unit 37. The light diffusion unit 37 diffuses the laser light incident from the mirror 80 into parallel light having a great width in side elevation and having a small width in top plan. The diffused linear laser light enters a projection lens 55. The projection lens 55 projects the diffused linear laser light onto a scanning mirror 56. The scanning mirror 56 is formed by a galvanomirror, for example. The scanning mirror 56 projects the linear laser light onto a screen 38 in front thereof to form a one-dimensional image formed by a row of pixels. Further, the scanning mirror 56 rotates according to an image signal. The scanning mirror 56 thereby scans such a one-dimensional image on the screen 38 to form a two-dimensional image.

Further, a light detection apparatus 45 is provided between the projection lens 55 and the scanning mirror 56. The light detection apparatus 45 measures the modulated light emitted from the pixel elements of the GLVs to determine modulation characteristics. Also, the light detection apparatus 45 detects nonuniformity in luminance and color displayed on the basis of variations in the modulation characteristics and illumination conditions. The light detection apparatus 45 includes a reflecting mirror 46, an optical sensor 47 formed by for example an integrating sphere or a CCD, and a lens 48 for converging deflected laser light. The lens 48 is interposed between the reflecting mirror 46 and the optical sensor 47.

The reflecting mirror 46 deflects the modulated light emitted from the projection lens 55 toward the optical sensor 47. When an integrating sphere is used, for example, the optical sensor 47 reflects the light input thereto within the integrating sphere so that the input light is not leaked to the outside of the integrating sphere. The optical sensor 47 thereby collects all of the incident light, and measures the energy of the incident light, that is, the light quantity of the incident light. The reflecting mirror 46 is placed at this position only when display nonuniformity is measured in advance, for example, to change the optical path. When an image is displayed actually, the reflecting mirror 46 is removed to restore the normal light path.

In addition, a method of providing a light detection apparatus 97 outside and near a normal optical path 99 for forming a two-dimensional image on a screen 98 as shown in FIG. 5 is proposed (for example, see WO2004/004167 A1, hereinafter called Patent Document 3).

According to Patent Document 3, as shown in FIG. 5, light applied from a light source 92 to a pixel element 94 is reflected by a scanner 96 and then applied to the screen 98. The scanner 96 is formed by a polygon mirror or the like. The scanner 96 rotates to scan a one-dimensional image on the screen 98 and thereby form a two-dimensional image, as in the case of the above-described galvanomirror.

The light detection apparatus 97 is disposed outside and near the normal optical path 99 facing in a direction of the screen 98. The light detection apparatus 97 is formed by a linear detector or the like, which detector is formed by arranging, in a row, photodiodes or the like for receiving light reflected from the scanner 96 and outputting a signal according to the received light. The light detection apparatus 97 measures modulated light emitted from each pixel element to determine modulation characteristics.

Thus, by detecting nonuniformity in modulation characteristics of a modulation element in advance and correcting a driving signal or the like on the basis of the detected modulation characteristics, it is possible to display a two-dimensional image with little degradation.

SUMMARY OF THE INVENTION

However, the technique according to Patent Document 2 requires the reflecting mirror 46, and therefore increases the number of parts, which may lead to an increase in manufacturing cost and a decrease in productivity. In addition, usually (when an image is actually displayed), the image display apparatus is used with the reflecting mirror 46 removed. Therefore, a place for housing the reflecting mirror 46, and the like are required, and an operation of inserting and removing the reflecting mirror, and the like is required, which may result in decreased convenience.

In the technique according to Patent Document 3, when modulation characteristics are measured, light emitted from pixels forming the pixel element 94 needs to correspond to respective photodiodes of the linear detector forming the light detection apparatus 97, and form an image on the respective photodiodes. It is thus necessary to provide an optical system for forming an image on the screen 98 and an optical system for forming an image on the light detection apparatus 97 separately from each other, thus complicating the configuration of the apparatus.

A magnifying optical system not shown in FIG. 5 needs to be disposed in order to actually display an image on the screen 98. When the magnifying optical system is disposed between the pixel element 94 and the scanner 96 to reduce a load on the scanner 96, for example, the pupil position of a projection lens used to magnify and project a one-dimensional intermediate image is disposed at a position distant from the lens, thus resulting in an increase in size of the projection lens. Further, when a magnification varying function is added to the projection lens, a scanning angle needs to be changed as magnification is varied. This complicates system configuration.

When the magnifying optical system is disposed between the scanner 96 and the light detection apparatus 97, an incoming range and an outgoing range of the magnifying optical system need to be extended to the outside of the optical path 99. This leads to for example an increase in size and manufacturing cost of the magnifying optical system.

Further, since the scanner 96 is formed by a polygon mirror, the position, angle, and the like of the polygon mirror need to be adjusted so that the scanning range of the polygon mirror exceeds the optical path 99 and covers the light detection apparatus 97. Therefore, when measurement of modulation characteristics is not performed, it is necessary to for example turn off the light source 92 when the polygon mirror is positioned so as to reflect light to the outside of the optical path 99. As a result, the brightness of an image may be decreased, and image flicker may occur.

Thus, the techniques in related art cannot display an image using a display element and efficiently measure the modulation characteristics of the display element.

The present invention has been made in view of such a situation, and it is desirable to make it possible to display an image using a display element and measure the modulation characteristics of the display element efficiently.

According to an embodiment of the present invention, there is provided an image display apparatus including: a spatial light modulating element formed with a plurality of light modulating elements for each modulating light from a light source, the light modulating elements being arranged in a row or a plurality of rows; a projection optical system for forming a first image on a basis of the light modulated by the spatial light modulating element; light deflecting means for forming a second image by reflecting the first image formed by the projection optical system so as to scan the first image in a direction orthogonal to a longitudinal direction of the first image, the longitudinal direction of the first image being a longer direction of the first image; a magnifying and projecting system for magnifying the second image and projecting the second image on a screen; and detecting means for detecting intensity of the light modulated by the spatial light modulating element and reflected by the light deflecting means via the projection optical system, the detecting means being disposed at a position that the light reflected from the light deflecting means enters without passing through the magnifying and projecting system, the position being off an optical path of the light going from the light deflecting means to the magnifying and projecting system. When the second image is projected on the screen, the light deflecting means reflects the first image toward the magnifying and projecting system so as to scan the first image in the direction orthogonal to the longitudinal direction of the first image, and when the intensity of the light modulated by the spatial light modulating element is detected, the light deflecting means reflects the light from the projection optical system toward the detecting means.

The light deflecting means can reflect the light in one of two ranges.

The light deflecting means can be formed by a galvanomirror.

When the second image is projected on the screen, the light deflecting means can reflect the first image toward the magnifying and projecting system so as to scan the first image in the direction orthogonal to the longitudinal direction of the first image on a basis of a first reference position, and when the intensity of the light modulated by the spatial light modulating element is detected, the light deflecting means can reflect the light as the first image from the projection optical system toward the detecting means on a basis of a second reference position.

The image display apparatus can further include driving means for driving the light deflecting means so as to change between the first reference position and the second reference position.

The detecting means can be formed by an integrating sphere.

The spatial light modulating element can be formed with a plurality of light modulating elements arranged in a row, and the projection optical system can form a one-dimensional image as the first image on the basis of the light modulated by the spatial light modulating element.

According to an embodiment of the present invention, there is provided an image display method of an image display apparatus. The image display apparatus includes a spatial light modulating element formed with a plurality of light modulating elements for each modulating light from a light source, the light modulating elements being arranged in a row or a plurality of rows, a projection optical system for forming a first image on a basis of the light modulated by the spatial light modulating element, light deflecting means for forming a second image by reflecting the first image formed by the projection optical system so as to scan the first image in a direction orthogonal to a longitudinal direction of the first image, the longitudinal direction of the first image being a longer direction of the first image, a magnifying and projecting system for magnifying the second image and projecting the second image on a screen, and detecting means for detecting intensity of the light modulated by the spatial light modulating element and reflected by the light deflecting means via the projection optical system, the detecting means being disposed at a position that the light reflected from the light deflecting means enters without passing through the magnifying and projecting system, the position being off an optical path of the light going from the light deflecting means to the magnifying and projecting system. The image detecting method includes the steps of reflecting the first image toward the magnifying and projecting system so as to scan the first image in the direction orthogonal to the longitudinal direction of the first image when the second image is projected on the screen, and reflecting the light from the projection optical system toward the detecting means when the intensity of the light modulated by the spatial light modulating element is detected.

In the image display apparatus and the image display method according to the embodiments of the present invention, a first image is formed by the projection optical system on a basis of light modulated by the spatial light modulating element, a second image is formed by the light deflecting means by reflecting the first image formed by the projection optical system so as to scan the first image in a direction orthogonal to a longitudinal direction of the first image, the longitudinal direction of the first image being a longer direction of the first image, the second image is magnified and projected on a screen by the magnifying and projecting system, intensity of the light modulated by the spatial light modulating element and reflected by the light deflecting means via the projection optical system is detected by the detecting means disposed at a position that the light reflected from the light deflecting means enters without passing through the magnifying and projecting system, the position being off an optical path of the light going from the light deflecting means to the magnifying and projecting system, and when the second image is projected on the screen, the first image is reflected toward the magnifying and projecting system so as to be scanned in the direction orthogonal to the longitudinal direction of the first image, and when the intensity of the light modulated by the spatial light modulating element is detected, the light from the projection optical system is reflected toward the detecting means.

According to an embodiment of the present invention, there is provided a first driving apparatus for driving light deflecting means for forming a second image by reflecting light of a first image formed by a projection optical system for forming the first image on a basis of light modulated by a spatial light modulating element formed with a plurality of light modulating elements arranged in a row or a plurality of rows so as to scan the light of the first image in a direction orthogonal to a longitudinal direction of the first image, the longitudinal direction of the first image being a longer direction of the first image, the driving apparatus driving the light deflecting means so as to make the light deflecting means reflect the first image toward a magnifying and projecting system for magnifying the second image and projecting the second image on a screen so as to scan the first image in the direction orthogonal to the longitudinal direction of the first image on a basis of a first reference position when the second image is projected on the screen, and the driving apparatus driving the light deflecting means so as to make the light deflecting means reflect the light from the projection optical system toward detecting means for detecting intensity of the light, the detecting means being disposed at a position off an optical path of the light going from the projection optical system to the magnifying and projecting system, on a basis of a second reference position when the intensity of the light modulated by the spatial light modulating element is detected.

The driving apparatus can drive the light deflecting means including a mirror for reflecting the light from the projection optical system.

The driving apparatus can further include: first driving means for driving the mirror such that the light reflected from the mirror is scanned in the direction orthogonal to the longitudinal direction of the first image; and auxiliary driving means for driving the light deflecting means so as to change a reference position of the light deflecting means to one of the first reference position and the second reference position.

The driving apparatus can further include driving control means for controlling the driving of the auxiliary driving means.

The light modulating elements are arranged in one row, and the projection optical system can form a one-dimensional image as the first image on the basis of the light modulated by the spatial light modulating element.

According to an embodiment of the present invention, there is provided a first driving method of a driving apparatus for driving light deflecting means for forming a second image by reflecting light of a first image formed by a projection optical system for forming the first image on a basis of light modulated by a spatial light modulating element formed with a plurality of light modulating elements arranged in a row or a plurality of rows so as to scan the light of the first image in a direction orthogonal to a longitudinal direction of the first image, the longitudinal direction of the first image being a longer direction of the first image. The driving method includes the steps of: making the light deflecting means reflect the first image toward a magnifying and projecting system for magnifying the second image and projecting the second image on a screen so as to scan the first image in the direction orthogonal to the longitudinal direction of the first image on a basis of a first reference position when the second image is projected on the screen; and making the light deflecting means reflect the light from the projection optical system toward detecting means for detecting intensity of the light, the detecting means being disposed at a position off an optical path of the light going from the projection optical system to the magnifying and projecting system, on a basis of a second reference position when the intensity of the light modulated by the spatial light modulating element is detected.

In the first driving apparatus and the first driving method according to the embodiments of the present invention, the first image is reflected by the light deflecting means toward the magnifying and projecting system for magnifying the second image and projecting the second image on the screen so as to the first image being scanned in the direction orthogonal to the longitudinal direction of the first image on the basis of the first reference position when the second image is projected on the screen, and the light from the projection optical system is reflected by the light deflecting means toward the detecting means for detecting the intensity of the light, the detecting means being disposed at the position off the optical path of the light going from the projection optical system to the magnifying and projecting system, on the basis of the second reference position when the intensity of the light modulated by the spatial light modulating element is detected.

According to an embodiment of the present invention, there is provided a second driving apparatus for driving light reflecting means for reflecting light so as to scan the light. The driving apparatus includes first rotating means for rotating a shaft on which the light reflecting means is provided in a predetermined rotation range corresponding to the scanning of the light, and second rotating means for rotating the shaft to a predetermined position outside the rotation range.

According to an embodiment of the present invention, there is provided a second driving method of a driving apparatus for driving light reflecting means for reflecting light so as to scan the light. The driving method includes the steps of rotating a shaft on which the light reflecting means is provided in a predetermined rotation range corresponding to the scanning of the light, and rotating the shaft to a predetermined position outside the rotation range.

In the second driving apparatus and the second driving method according to the embodiments of the present invention, the shaft on which the light reflecting means is provided is rotated by the first rotating means in the predetermined rotation range corresponding to the scanning of the light, and the shaft is rotated by the second rotating means to the predetermined position outside the rotation range.

According to the present invention, it is possible to display an image using a display element and measure the modulation characteristics of the display element efficiently.

DETAILED DESCRIPTION OF THE PREFERRED EMBODIMENTS

Figure 1:
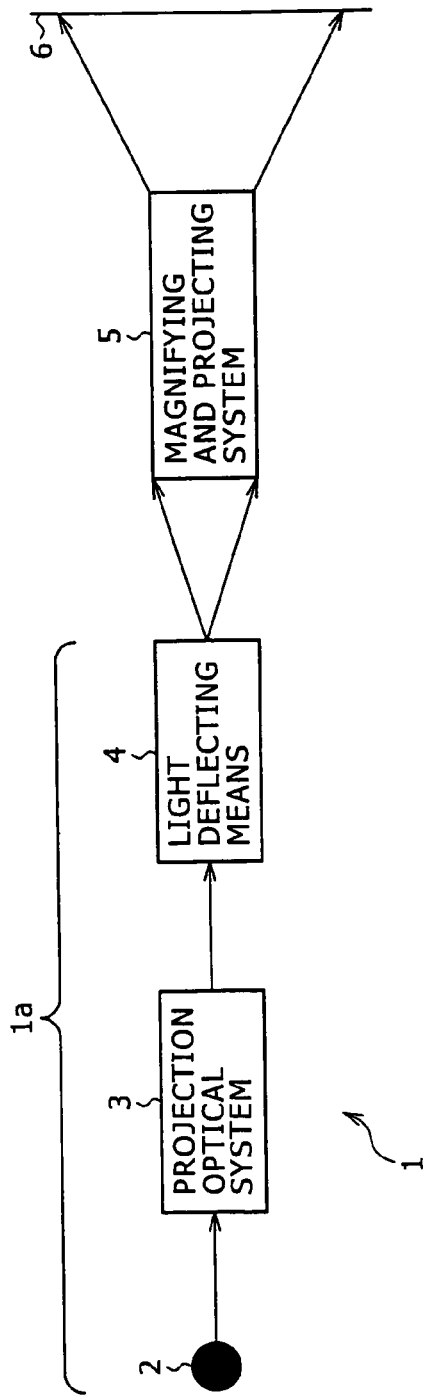
FIG. 1 is a block diagram showing an example of configuration of an image display apparatus in related art.
Figure 2:
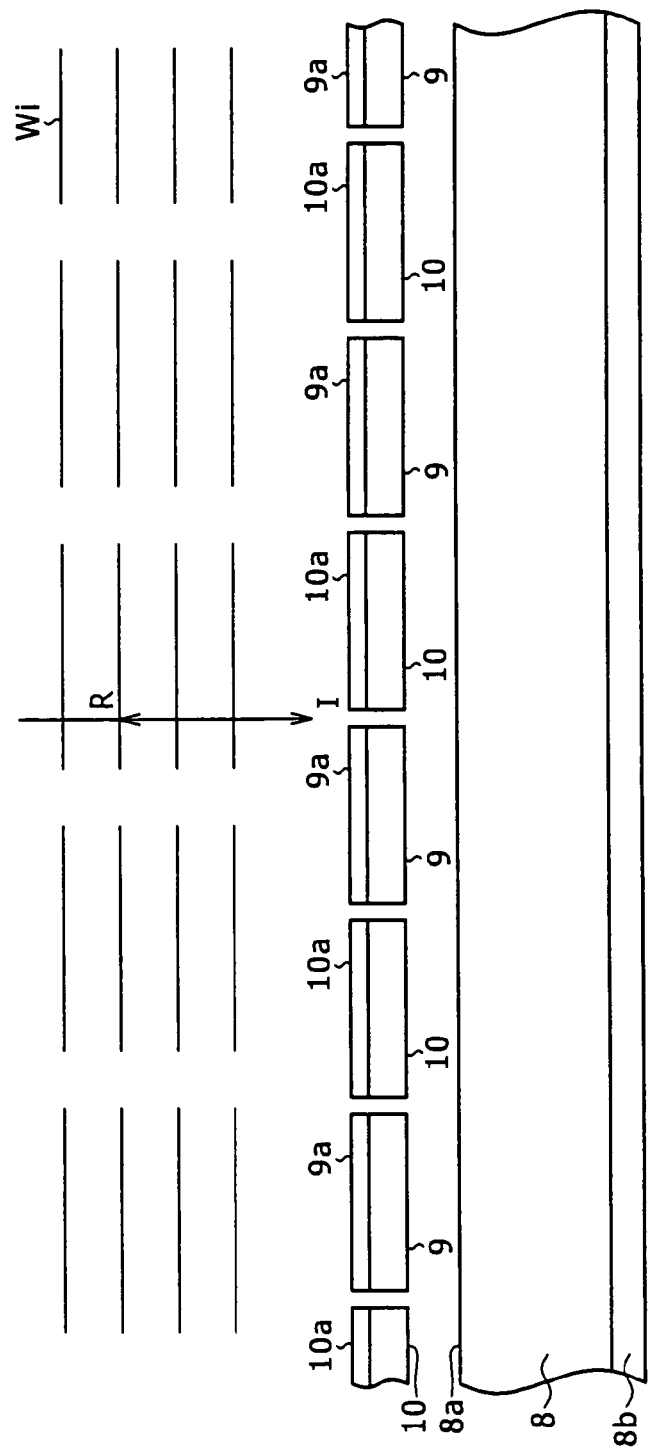
FIG. 2 is a diagram of assistance in explaining operating principles of a GLV element.
Figure 3:
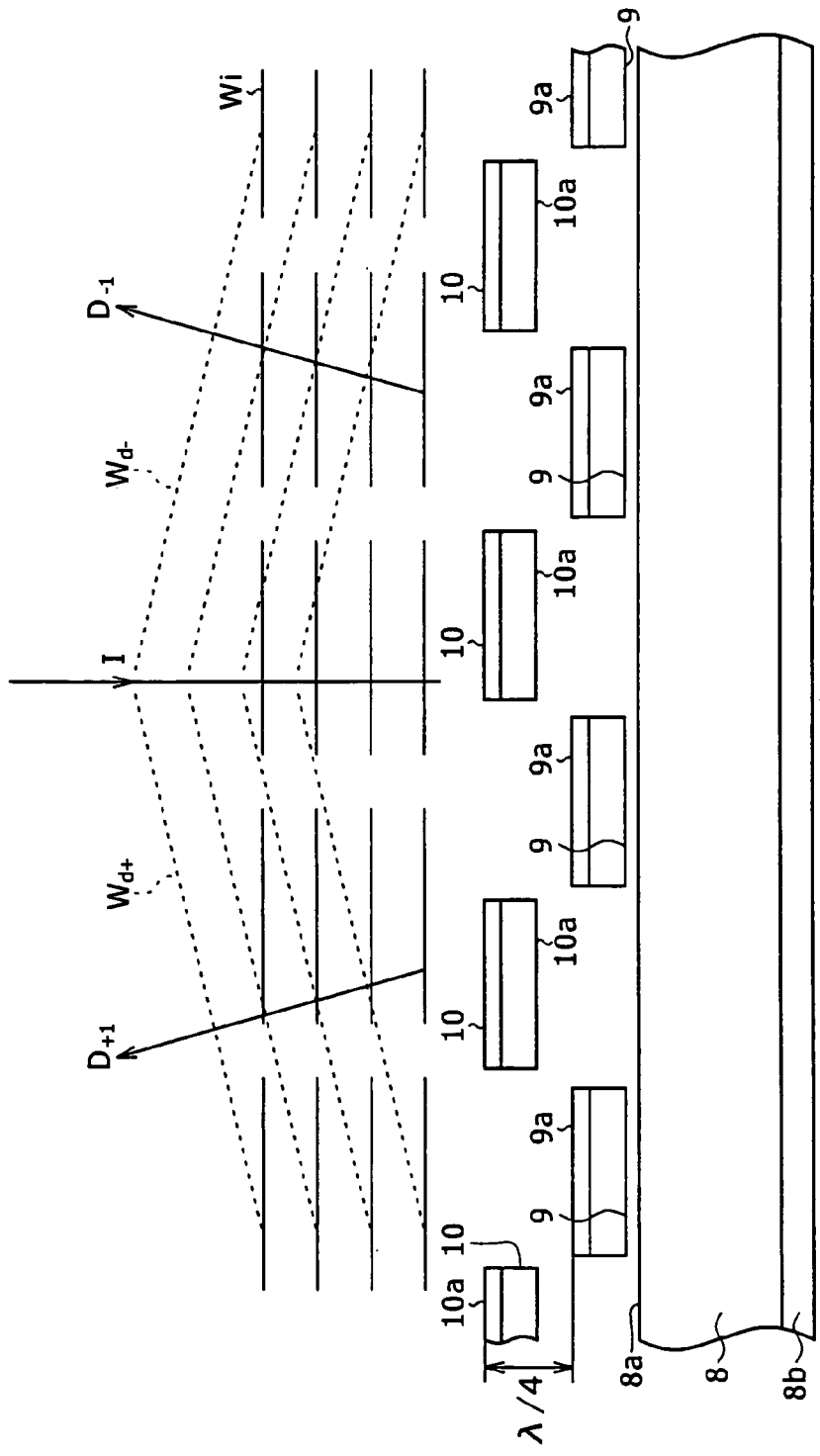
FIG. 3 is a diagram of assistance in explaining operating principles of a GLV element.
Figure 4:
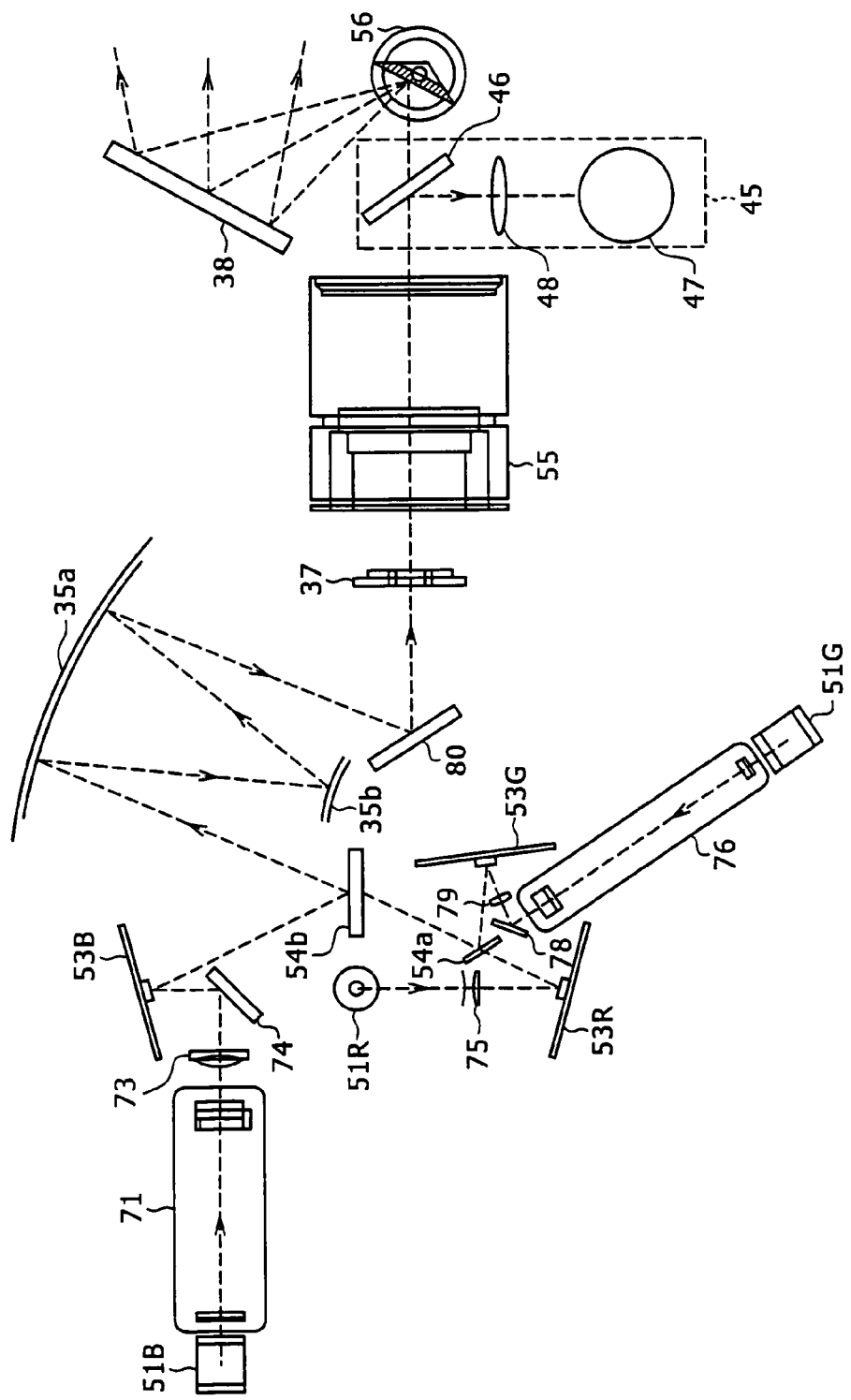
FIG. 4 is a block diagram showing another example of configuration of an image display apparatus of related art.
Figure 5:
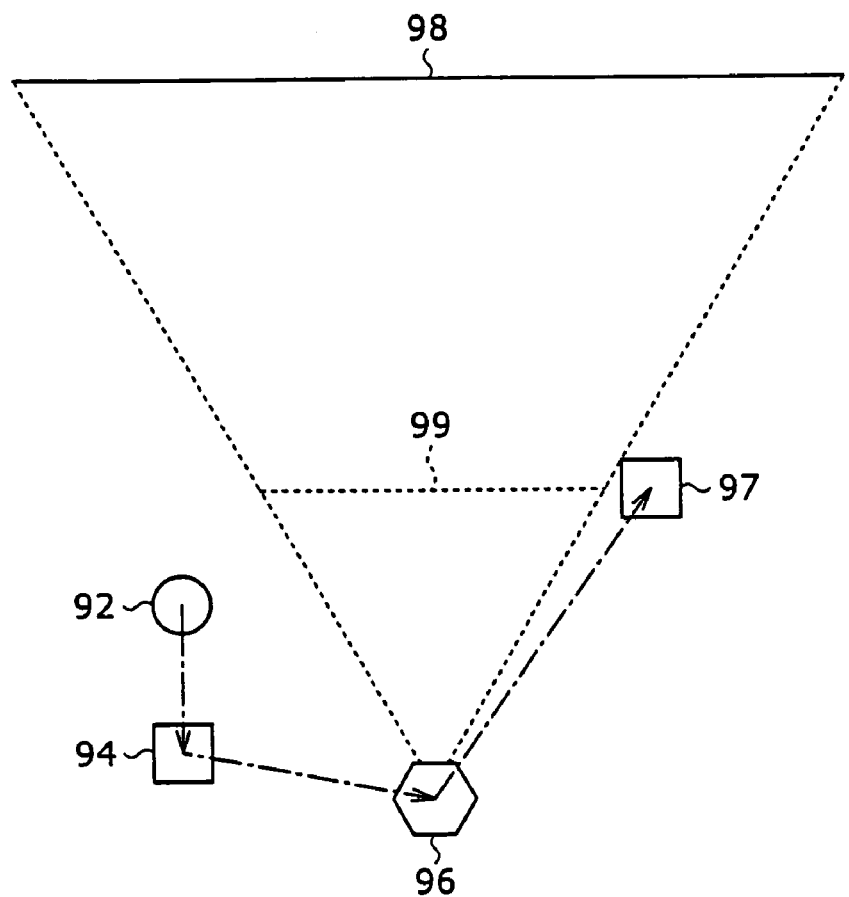
FIG. 5 is a block diagram showing another example of configuration of an image display apparatus of related art.

Preferred embodiments of the present invention will hereinafter be described. Correspondences between inventions described in the present specification and embodiments of the inventions are illustrated as follows. This description is to confirm that embodiments supporting the inventions described in the present specification are described in the specification. Therefore, even when there is an embodiment described in the specification but not described here, it does not mean that the embodiment does not correspond to the invention. Conversely, even when an embodiment is described here as corresponding to an invention, it does not mean that the embodiment does not correspond to inventions other than that invention.

Further, this description does not signify that all the inventions described in the specification are claimed. In other words, this description does not negate presence of inventions described in the specification but not claimed in the present application, that is, presence of inventions to be presented or added by a divisional application or an amendment in the future.

An image display apparatus includes: a spatial light modulating element (for example a display element 111 in FIG. 6) formed with a plurality of light modulating elements for each modulating light from a light source (for example a light source 120 in FIG. 6), the light modulating elements being arranged in a row or a plurality of rows; a projection optical system (for example a projection optical system 112 in FIG. 6) for forming a first image on a basis of the light modulated by the spatial light modulating element; light deflecting means (for example a light deflecting unit 113 in FIG. 6) for forming a second image by reflecting the first image formed by the projection optical system so as to scan the first image in a direction orthogonal to a longitudinal direction of the first image, the longitudinal direction of the first image being a longer direction of the first image; a magnifying and projecting system (for example a magnifying and projecting system 115 in FIG. 6) for magnifying the second image and projecting the second image on a screen (for example a screen 116 in FIG. 6); and detecting means (for example a light detecting unit 114 in FIG. 6) for detecting intensity of the light modulated by the spatial light modulating element and reflected by the light deflecting means via the projection optical system, the detecting means being disposed at a position that the light reflected from the light deflecting means enters without passing through the magnifying and projecting system, the position being off an optical path (for example an optical path 117 in FIG. 6) of the light going from the light deflecting means to the magnifying and projecting system; wherein when the second image is projected on the screen, the light deflecting means reflects the first image toward the magnifying and projecting system so as to scan the first image in the direction orthogonal to the longitudinal direction of the first image, and when the intensity of the light modulated by the spatial light modulating element is detected, the light deflecting means reflects the light from the projection optical system toward the detecting means.

Figure 6:
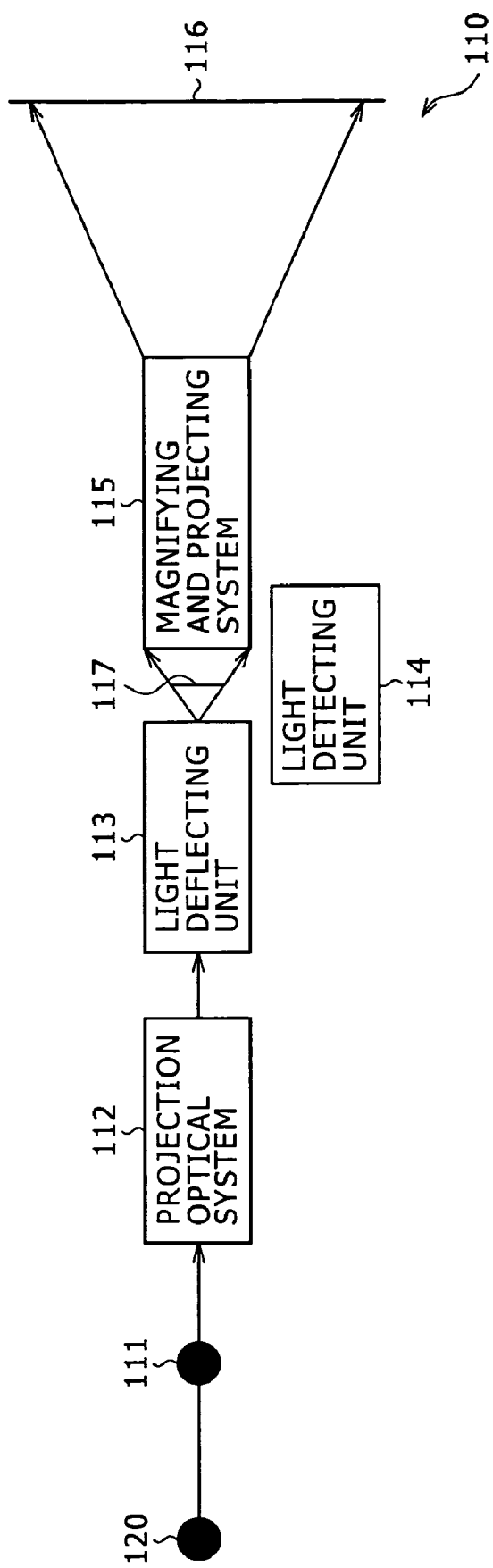
FIG. 6 is a block diagram showing an example of configuration of an image display apparatus according to an embodiment of the present invention.

In the image display apparatus, the light deflecting means can reflect the light in one of two ranges (for example a range of the optical path 117 in FIG. 6 and a range to the light detecting unit 114).

Figure 13:
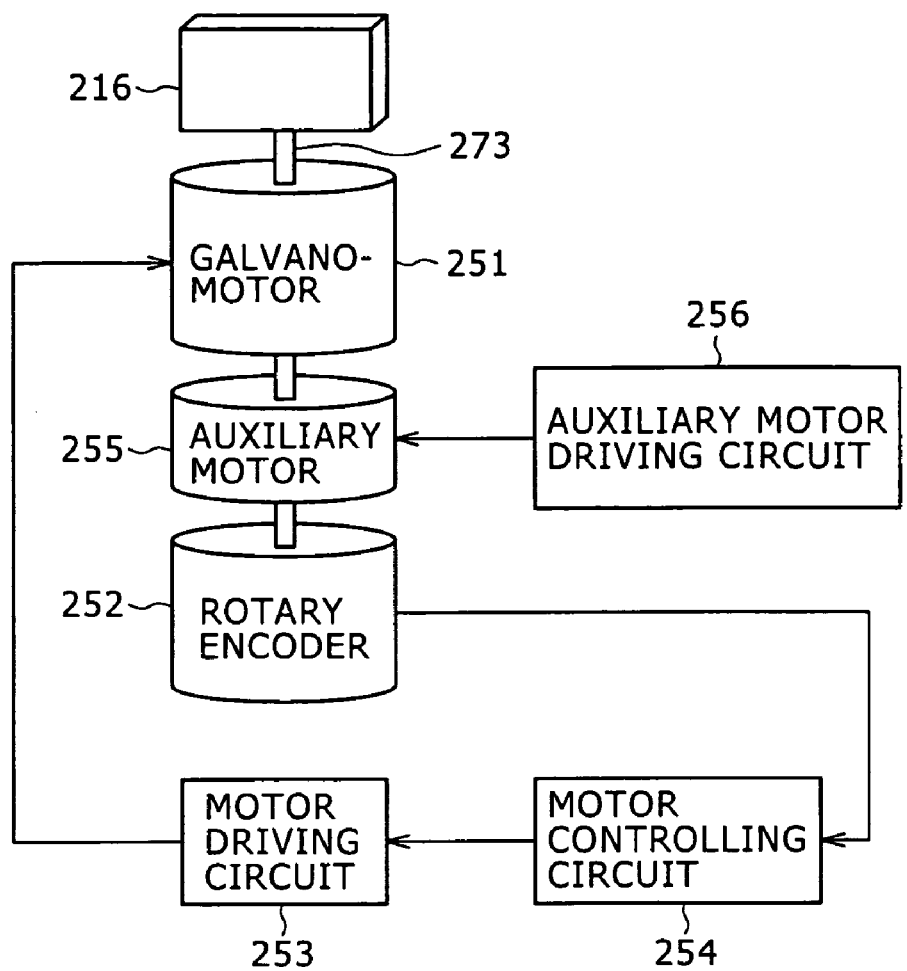
FIG. 13 is a diagram showing a concrete example of configuration of a light deflecting unit.

In the image display apparatus, the light deflecting means can be formed by a galvanomirror (for example a scanning mirror 216 and a galvanomotor 251 in FIG. 13).

In the image display apparatus, when the second image is projected on the screen, the light deflecting means can reflect the first image toward the magnifying and projecting system so as to scan the first image in the direction orthogonal to the longitudinal direction of the first image on a basis of a first reference position (for example a reference position A), and when the intensity of the light modulated by the spatial light modulating element is detected, the light deflecting means can reflect the light as the first image from the projection optical system toward the detecting means on a basis of a second reference position (for example a reference position B).

The image display apparatus can further include driving means (for example an auxiliary motor 255 in FIG. 13 or a rotary base 257 in FIG. 17) for driving the light deflecting means so as to change between the first reference position and the second reference position.

Figure 12:
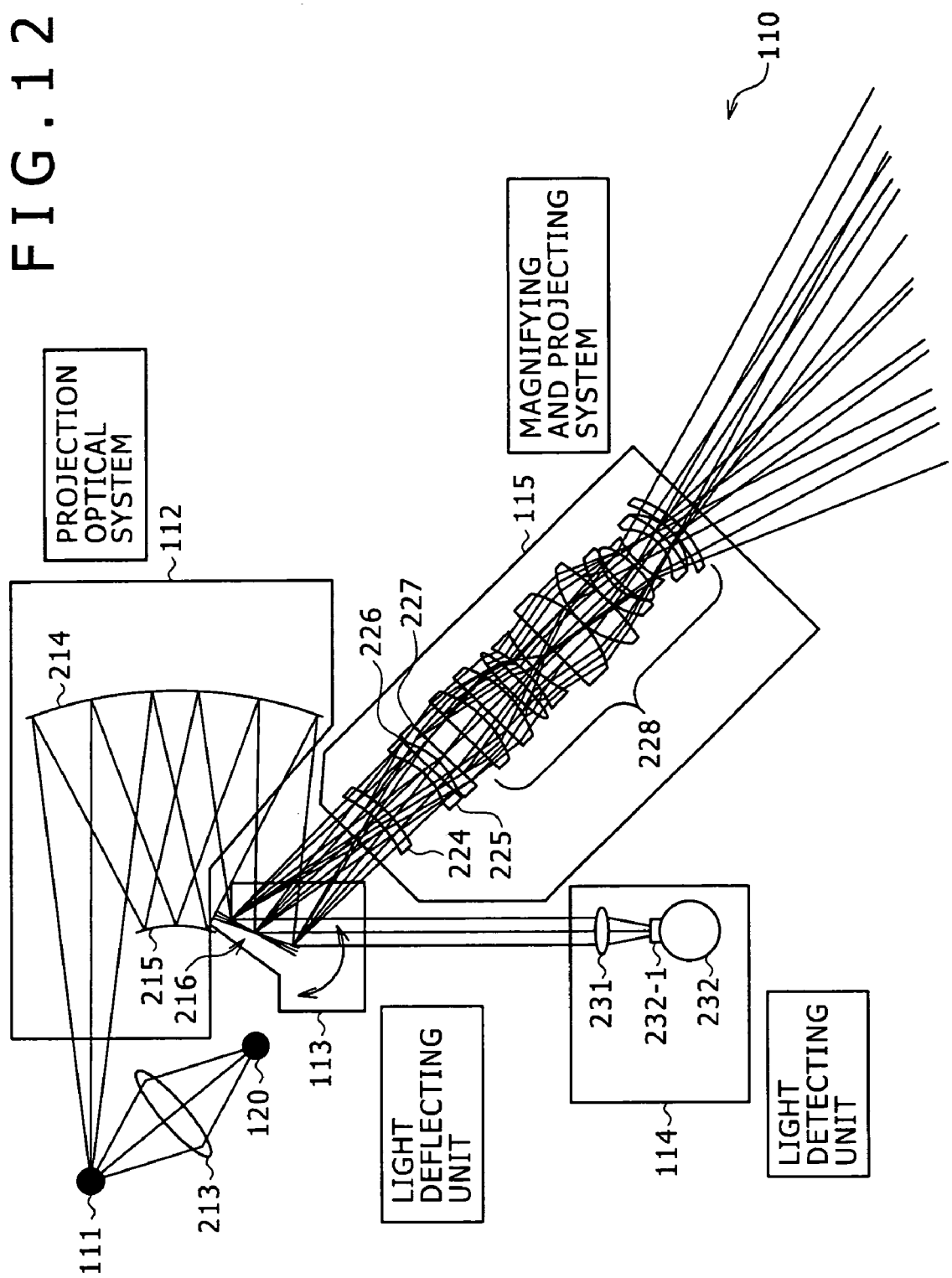
FIG. 12 is a diagram showing a concrete example of configuration of the image display apparatus of FIG. 6.

In the image display apparatus, the detecting means can be formed by an integrating sphere (for example an integrating sphere 232 in FIG. 12).

In the image display apparatus, the spatial light modulating element can be formed with a plurality of light modulating elements arranged in a row (for example a GLV or a DMD), and the projection optical system can form a one-dimensional image as the first image on a basis of the light modulated by the spatial light modulating element.

An image display method is of an image display apparatus including a spatial light modulating element (for example a display element 111 in FIG. 6) formed with a plurality of light modulating elements for each modulating light from a light source (for example a light source 120 in FIG. 6), the light modulating elements being arranged in a row or a plurality of rows, a projection optical system (for example a projection optical system 112 in FIG. 6) for forming a first image on a basis of the light modulated by the spatial light modulating element, light deflecting means (for example a light deflecting unit 113 in FIG. 6) for forming a second image by reflecting the first image formed by the projection optical system so as to scan the first image in a direction orthogonal to a longitudinal direction of the first image, the longitudinal direction of the first image being a longer direction of the first image, a magnifying and projecting system (for example a magnifying and projecting system 115 in FIG. 6) for magnifying the second image and projecting the second image on a screen (for example a screen 116 in FIG. 6), and detecting means (for example a light detecting unit 114 in FIG. 6) for detecting intensity of the light modulated by the spatial light modulating element and reflected by the light deflecting means via the projection optical system, the detecting means being disposed at a position that the light reflected from the light deflecting means enters without passing through the magnifying and projecting system, the position being off an optical path (for example an optical path 117 in FIG. 6) of the light going from the light deflecting means to the magnifying and projecting system. Te image detecting method includes the steps of reflecting the first image toward the magnifying and projecting system so as to scan the first image in the direction orthogonal to the longitudinal direction of the first image when the second image is projected on the screen, and reflecting the light from the projection optical system toward the detecting means when the intensity of the light modulated by the spatial light modulating element is detected (for example a process of steps S2, S3, and S6 in FIG. 18).

A driving apparatus is a driving apparatus (for example a galvanomotor 251 to an auxiliary motor driving circuit 256 in FIG. 13) for driving light deflecting means (for example a scanning mirror 216 in FIG. 13) for forming a second image by reflecting light of a first image formed by a projection optical system (for example a projection optical system 112 in FIG. 6) for forming the first image on a basis of light modulated by a spatial light modulating element (for example a display element 111 in FIG. 6) formed with a plurality of light modulating elements arranged in a row or a plurality of rows so as to scan the light of the first image in a direction orthogonal to a longitudinal direction of the first image, the longitudinal direction of the first image being a longer direction of the first image, the driving apparatus driving the light deflecting means so as to make the light deflecting means reflect the first image toward a magnifying and projecting system (for example a magnifying and projecting system 115 in FIG. 6) for magnifying the second image and projecting the second image on a screen so as to scan the first image in the direction orthogonal to the longitudinal direction of the first image on a basis of a first reference position when the second image is projected on the screen, and the driving apparatus driving the light deflecting means so as to make the light deflecting means reflect the light from the projection optical system toward detecting means (for example a light detecting unit 114 in FIG. 6) for detecting intensity of the light, the detecting means being disposed at a position off an optical path (for example an optical path 117 in FIG. 6) of the light going from the projection optical system to the magnifying and projecting system, on a basis of a second reference position when the intensity of the light modulated by the spatial light modulating element is detected.

The driving apparatus can drive the light deflecting means including a mirror (for example a scanning mirror 216 in FIG. 13) for reflecting the light from the projection optical system.

The driving apparatus can further include: first driving means (for example a galvanomotor 251 in FIG. 13 or FIG. 17) for driving the mirror such that the light reflected from the mirror is scanned in the direction orthogonal to the longitudinal direction of the first image; and auxiliary driving means (for example an auxiliary motor 256 in FIG. 13 or a rotary base 257 in FIG. 17) for driving the light deflecting means so as to change a reference position of the light deflecting means to one of the first reference position and the second reference position.

The driving apparatus can further include driving control means (for example an auxiliary motor driving circuit 256 in FIG. 13) for controlling the driving of the auxiliary driving means.

In the driving apparatus, the light modulating elements (for example a GLV) are arranged in one row, and the projection optical system can form a one-dimensional image as the first image on a basis of the light modulated by the spatial light modulating element.

A driving method is a driving method of a driving apparatus (for example a galvanomotor 251 to an auxiliary motor driving circuit 256 in FIG. 13) for driving light deflecting means (for example a scanning mirror 216 in FIG. 13) for forming a second image by reflecting light of a first image formed by a projection optical system (for example a projection optical system 112 in FIG. 6) for forming the first image on a basis of light modulated by a spatial light modulating element (for example a display element 111 in FIG. 6) formed with a plurality of light modulating elements arranged in a row or a plurality of rows so as to scan the light of the first image in a direction orthogonal to a longitudinal direction of the first image, the longitudinal direction of the first image being a longer direction of the first image. The driving method includes the steps of: of making the light deflecting means reflect the first image toward a magnifying and projecting system for magnifying the second image and projecting the second image on a screen so as to scan the first image in the direction orthogonal to the longitudinal direction of the first image on a basis of a first reference position when the second image is projected on the screen; and making the light deflecting means reflect the light (for example a process of step S6 in FIG. 18) from the projection optical system toward detecting means (for example a light detecting unit 114 in FIG. 6) for detecting intensity of the light, the detecting means being disposed at a position off an optical path (for example an optical path 117 in FIG. 6) of the light going from the projection optical system to the magnifying and projecting system, on a basis of a second reference position when the intensity of the light modulated by the spatial light modulating element is detected (for example a process of step S3 in FIG. 18).

A driving apparatus is for driving light reflecting means (for example a scanning mirror 216 in FIG. 13) for reflecting light so as to scan the light. The driving apparatus includes first rotating means (for example a galvanomotor 251 in FIG. 13) for rotating a shaft on which the light reflecting means is provided in a predetermined rotation range corresponding to the scanning of the light, and second rotating means (an auxiliary motor 255 in FIG. 13) for rotating the shaft to a predetermined position outside the rotation range.

A driving method is of a driving apparatus for driving light reflecting means (for example a scanning mirror 216 in FIG. 13) for reflecting light so as to scan the light. The driving method includes: a first setting step (for example a process of step S3 in FIG. 18) of making a setting so as to rotate a shaft on which the light reflecting means is provided in a predetermined rotation range corresponding to the scanning of the light; and a second setting step (for example a process of step S6 in FIG. 18) of making a setting so as to rotate the shaft to a predetermined position outside the rotation range.

Embodiments of the present invention will be described below with reference to the drawings. FIG. 6 is a block diagram showing one embodiment of an image display apparatus 110 according to the present invention. In the figure, a display element 111, a projection optical system 112, and a light deflecting unit 113 are provided.

The display element 111 is formed by arranging a plurality of light emitting parts or light modulating parts along one direction. The display element 111 is formed by a one-dimensional light emitting display element in which a plurality of light emitting parts are arranged in a line form, or a spatial light modulating element in which a plurality of light modulating parts are arranged in a line form, for example.

A GLV (Grating Light Valve) made by Silicon Light Machines of the U.S., for example, is used as the spatial light modulating element (see U.S. Pat. No. 5,311,360). The grating light valve is formed by a phase reflection type diffraction grating formed by making full use of MEMS (Micro Electro-Mechanical System) technology. Since the GLV element itself does not emit light, a light source 120 is provided.

The structure and operation of a GLV will be described with reference to FIGS. 7 to 9.

Figure 7:
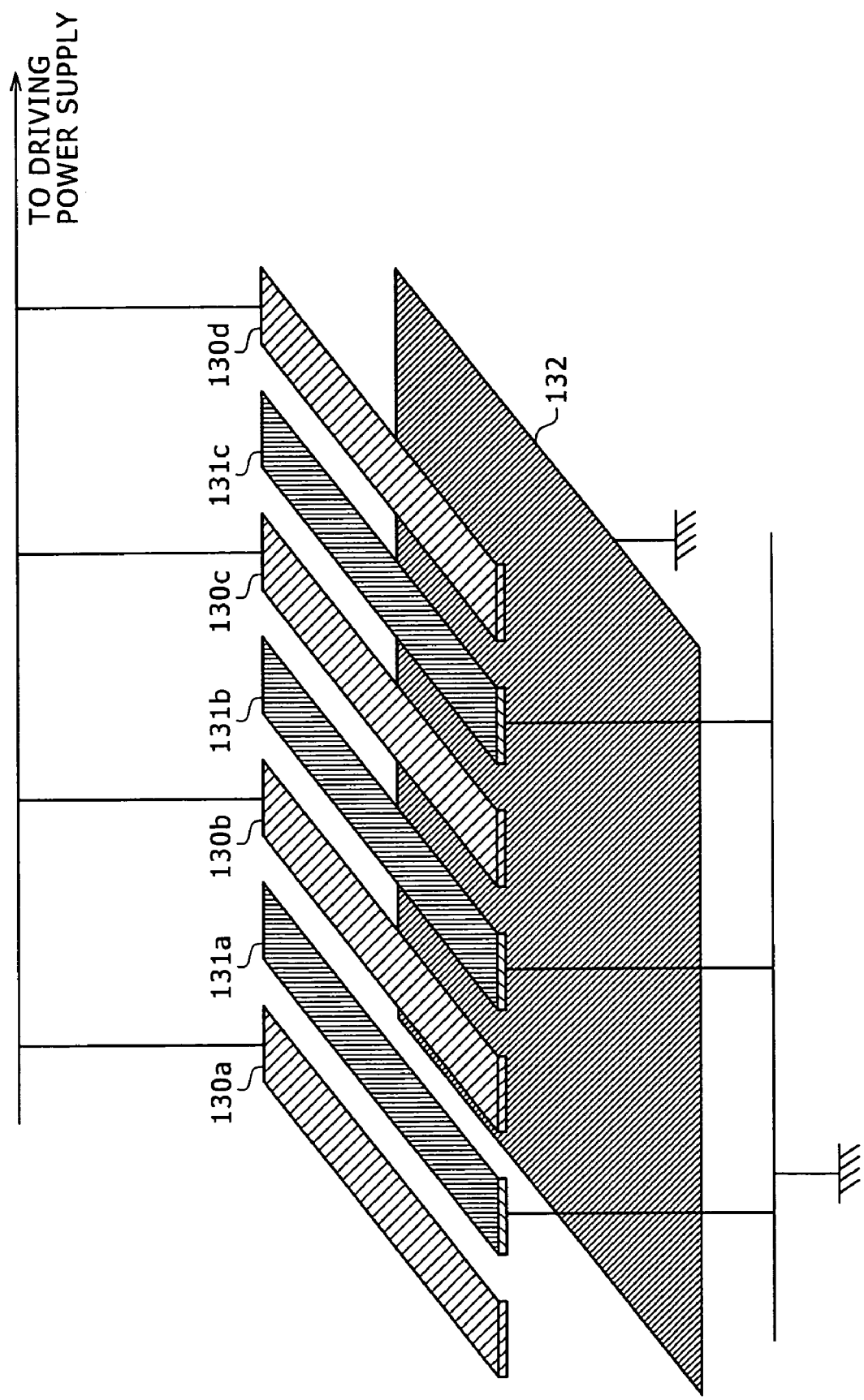
FIG. 7 is a diagram showing an example of structure of a GLV element.

FIG. 7 is a perspective view of an example of structure of a GLV. As shown in the figure, the GLV has strip-shaped ribbon electrodes 130a, 131a, 130b, 131b, 130c, 131c, and 130d formed above a common electrode 132 formed of a polysilicon thin film on a silicon substrate, at a predetermined distance from the common electrode 132. These ribbon electrodes have a reflective film (not shown) formed on a top surface thereof, and thus act as a reflective member.

When a driving voltage is applied to the ribbon electrodes 130a, 130b, 130c and 130d, an electrostatic force is generated between the ribbon electrodes 130a, 130b, 130c, and 130d and the common electrode 132. The electrostatic force moves or deforms the ribbon electrodes 130a, 130b, 130c, and 130d in an upward or downward direction in FIG. 7 according to the driving voltage to thereby change the height of the reflective films of the ribbon electrodes 130a, 130b, 130c, and 130d. Meanwhile, the ribbon electrodes 131a, 131b, and 131c remain at fixed positions and do not move.

The ribbon electrodes 130a, 130b, 130c, and 130d which can be moved or deformed are referred to as movable ribbon electrodes, and the ribbon electrodes 131a, 131b, and 131c which do not move are referred to as fixed ribbon electrodes.

As for typical dimensions of the ribbon electrodes, the ribbon electrodes each have for example a width of 3 to 4 μm, a gap of about 0.6 μm between adjacent ribbon electrodes, and a length of about 200 to 400 μm. A plurality of ribbon electrodes can be used as a set for one pixel. For example, the six adjacent ribbon electrodes 130a, 131a, 130b, 131b, 130c, and 131c can be used to represent one pixel. In this instance, the width of one pixel is about 25 μm. For example, in a GLV that is being put to practical use and displays 1080 pixels, a large number of ribbon electrodes for 1080 pixels are arranged along a transverse direction in FIG. 7.

Figure 8:
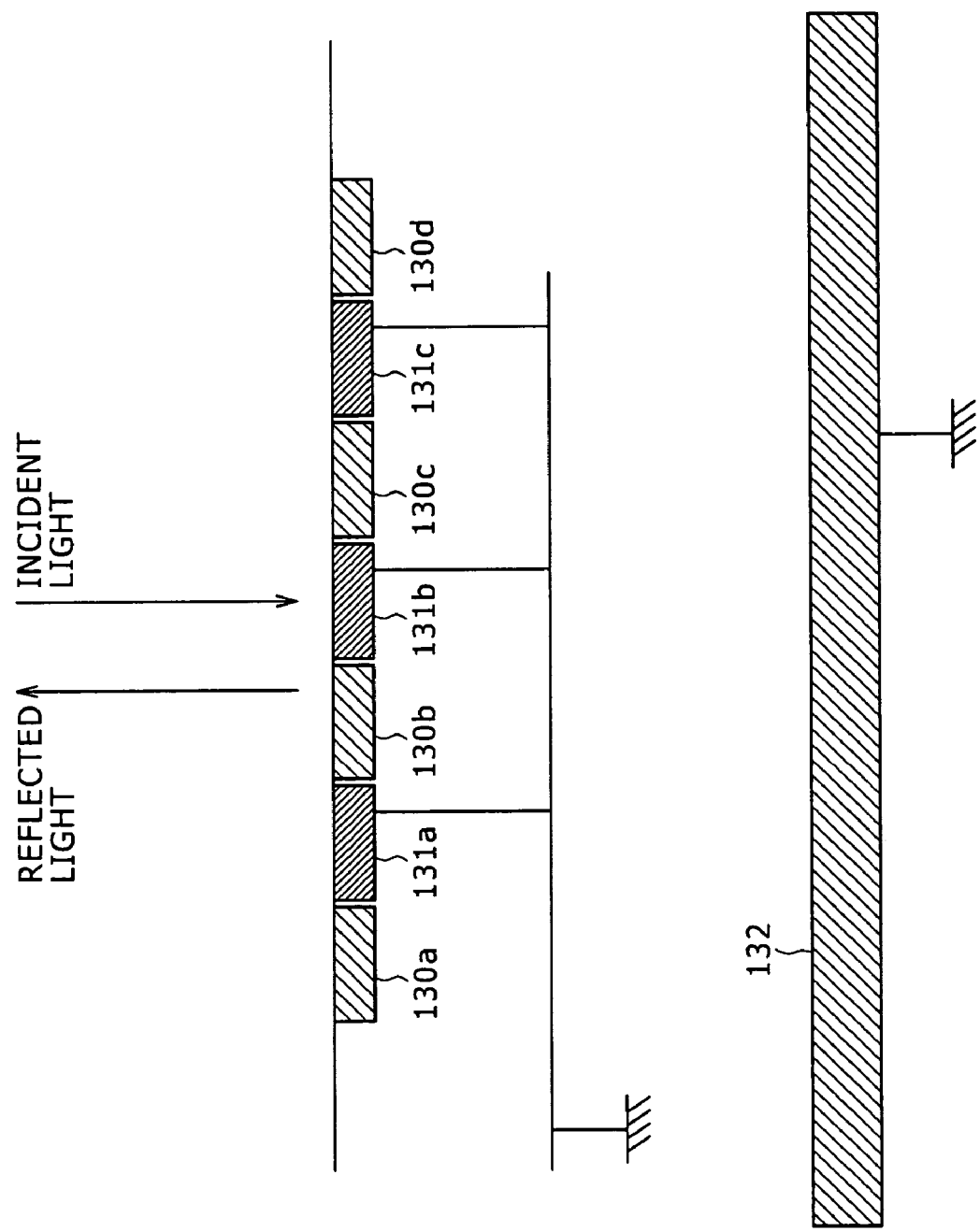
FIG. 8 is a diagram of assistance in explaining the operation of the GLV element of FIG. 7.
Figure 9:
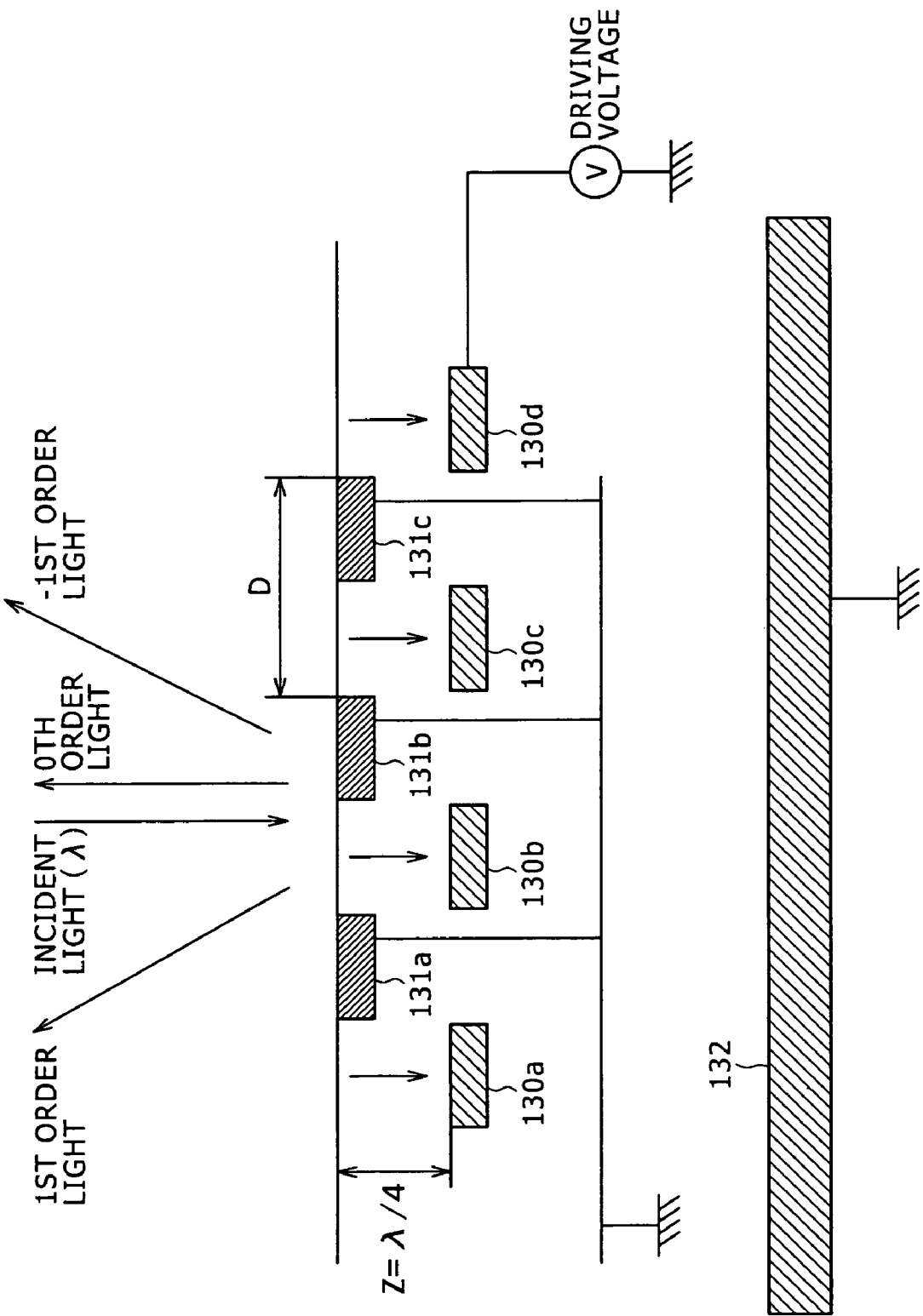
FIG. 9 is a diagram of assistance in explaining the operation of the GLV element of FIG. 7.

FIGS. 8 and 9 are sectional views of the GLV in a transverse direction of the GLV shown in FIG. 7. In FIG. 8, the driving voltage to the movable ribbon electrodes 130a, 130b, 130c, and 130d is OFF, and the fixed ribbon electrodes 131a, 131b, and 131c are each grounded. This state is referred to as an OFF state of the GLV.

Since the driving voltage is zero, the movable ribbon electrodes 130a, 130b, 130c, and 130d do not move, and all the ribbon electrodes maintain a fixed distance from the common electrode 132 and are positioned on the same plane.

When illumination light falls on the ribbon electrodes in this state, there is no total optical path difference between pieces of reflected light reflected by the respective ribbon electrodes 130a, 131a, 130b, 131b, 130c, 131c, and 130d, and only diffracted light of even-numbered orders such as 0th-order light (in an ordinary reflection direction) and ±2nd-order light is produced. In the OFF state of the GLV, a screen 116 is black.

In FIG. 9, a predetermined driving voltage is applied to each of the movable ribbon electrodes 130a, 130b, 130c, and 130d, while the fixed ribbon electrodes 131a, 131b, and 131c are each grounded. The movable ribbon electrodes 130a, 130b, 130c, and 130d to which the driving voltage is applied are pulled down to the common electrode 132 side (move to a downward direction in the figure) by electrostatic force.

For example, where the wavelength λ of incident light is 532 nm, when the movable ribbon electrodes 130a, 130b, 130c, and 130d are pulled down by λ/4 in response to the driving voltage applied thereto, the movable ribbon electrodes move by λ/4=133 nm. When an amount of movement of the movable ribbon electrodes 130a, 130b, 130c, and 130d is λ/4, the diffraction efficiency of first order light is at a maximum.

In this state, when illumination light falls on the ribbon electrodes, a total light path difference between luminous fluxes reflected by the movable ribbon electrodes 130a, 130b, 130c, and 130d and luminous fluxes reflected by the fixed ribbon electrodes 131a, 131b, and 131c is a half wavelength λ/2. Thereby, the GLV functions as a reflection type diffraction grating and produces diffracted light including odd-numbered order light such as ±1st order light, ±3rd order light, and the like while the reflected light fluxes (0th order light) interfere with each other and cancel each other out. The diffracted light of the different orders thus produced by the GLV is modulated spatially, and then projected on the light deflecting unit 113 via the projection optical system 112.

Incidentally, the display element 111 is generally formed by GLVs corresponding to three colors R, G, and B. Similarly, the light source 120 is generally formed by laser light sources or the like corresponding to the three colors R, G, and B.

While the above description has been made of an example where the display element 111 is formed by a one-dimensional spatial light modulating element having a plurality of light modulating parts arranged in a line form (arranged in a row), the light modulating parts are not limited to those arranged in a row, and the display element 111 may be formed by a spatial light modulating element having a plurality of light modulating parts arranged in a plurality of rows, for example. Even when the light modulating parts are arranged in two rows, for example, the light deflecting unit 113 to be described later scans an image formed by light emitted from the spatial light modulating element in a direction orthogonal to a direction of arrangement of the light modulating parts (longitudinal direction), whereby a desired two-dimensional image can be obtained. The display element 111 may be formed by the spatial light modulating element having light modulating parts thus arranged in a plurality of rows, to thus form the image display apparatus 110 as shown in FIG. 6.

Also, while the above description has been made of an example where the GLV is used as a spatial light modulating element, a DMD (Digital Micro mirror Device: trademark), a liquid crystal element, or the like may be used in place of the GLV. The DMD has hundreds of thousands of mirrors moving independently on a CMOS (Complementary Metal-Oxide Semiconductor) semiconductor, and can form an image by making the mirrors reflect light from a light source.

Returning to FIG. 6, the projection optical system 112 forms a projected image by reflecting light incident from the display element 111 three times or more, and is a reflection type projection optical system. For example, an Offner optical system disclosed in U.S. Pat. No. 3,748,015 is exemplified as a basic system for unmagnification projection, and reflection is performed three times in this system. That is, the Offner optical system is formed by using a pair of reflectors so that a first reflection and a third reflection are performed on a curved surface having the same center and the same radius of curvature and a second reflection is performed on a different surface.

An optical system advanced from the Offner optical system is disclosed in, for example, "Optical design using computer graphics" by Joseph M. Howard, APPLIED OPTICS, Vol. 40, No. 19, p 3225. Further, as for a reducing system or a magnifying system employing the reflection projection optical system, for example systems in which reflection is performed three times are disclosed in Japanese Patent No. 2603225, U.S. Pat. Nos. 5,153,898, 5,220,590, 5,353,322, and the like. Systems in which reflection is performed four times are exemplified in U.S. Pat. Nos. 5,063,586 and 5,410,434, Japanese Patent Laid-Open No. 2000-98227, and the like. An arrangement disclosed in Japanese Patent Laid-Open No. Hei 9-211322 is exemplified as an example using reflection performed more than four times. Although these examples are shown as a reduction system or a magnification system, the relationship between reduction and magnification is reversed by reversing an object-image relation. Further, in any of the cases, a two-dimensional image can be obtained by performing scanning by light deflection.

The light deflecting unit 113 is provided to form a two-dimensional image by scanning the light from the projection optical system 112. That is, the light deflecting unit 113 provides the two-dimensional image by reflecting the outgoing light, which is obtained after the light is reflected by the projection optical system 112 three times or more, and scanning the reflected light in a plane including a direction orthogonal to a direction of arrangement of the light emitting parts or the light modulating parts in the one-dimensional display element 111, for example. The light deflecting unit 113 is formed by a rotary reflector such as a galvanomirror, for example. Incidentally, a detailed configuration of the light deflecting unit 113 including the galvanomirror will be described later with reference to FIG. 13.

The image display apparatus 110 according to the embodiment of the present invention uses a rotary reflector such as a galvanomirror or the like. Hence, adjustment of the position and angle of the mirror, and the like can be simplified as compared with a polygon mirror, for example. In addition, since the image display apparatus 110 according to the embodiment of the present invention eliminates the need for blinking the light source 120, the image display apparatus 110 can display a brighter image, and suppress occurrence of image flicker. Further, since the configuration of the apparatus is thus simplified, the image display apparatus 110 can be realized at low cost.

The two-dimensional image obtained through the light deflecting unit 113 is magnified through a magnifying and projecting system 115, and then projected onto the screen 116. That is, the magnifying and projecting system 115 is an optical system for magnifying and projecting the two-dimensional image obtained by the projection optical system 112 and the light deflecting unit 113 using the two-dimensional image as an intermediate image.

A light detecting unit 114 is provided between the light deflecting unit 113 and the magnifying and projecting system 115, and outside and near an optical path 117 of the light reflected from the light deflecting unit 113 and going toward the magnifying and projecting system 115.

In the image display apparatus 110 according to the embodiment of the present invention, the magnifying and projecting system 115 is provided between the light deflecting unit 113 and the screen 116, and the light detecting unit 114 is provided between the light deflecting unit 113 and the magnifying and projecting system 115. Hence, a projection lens used for magnification and projection does not need to be increased in size, and an incoming range and an outgoing range of the magnifying and projecting system 115 can be limited to the range of the optical path 117.

Figure 10:
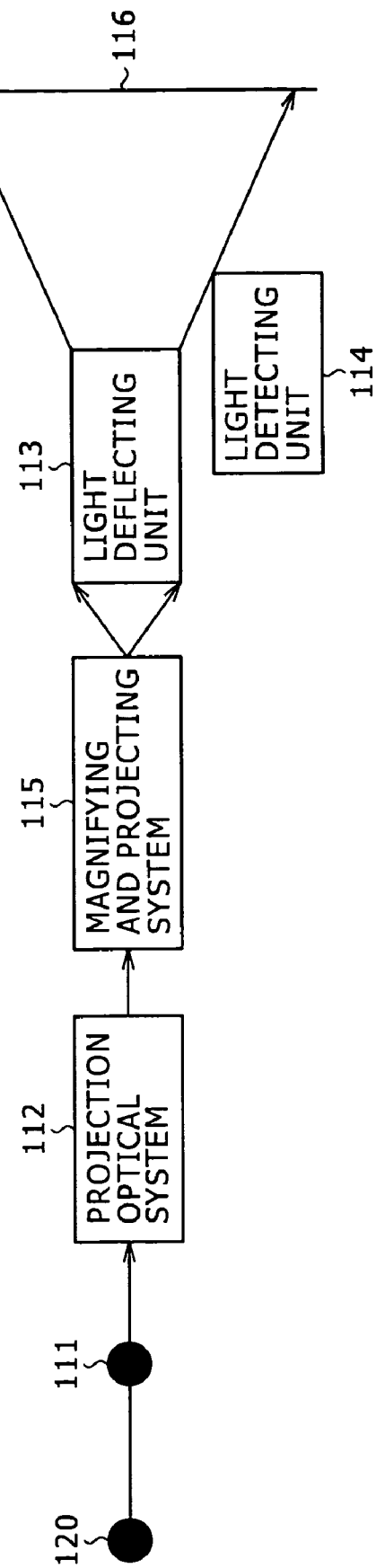
FIG. 10 is a block diagram showing an example of configuration of an image display apparatus different from the present invention.

As shown in FIG. 10, for example, when the magnifying and projecting system 115 is disposed between the projection optical system 112 and the light deflecting unit 113, the pupil position of a projection lens used for magnifying and projecting a one-dimensional intermediate image, for example, is distant from the lens, thus resulting in an increase in size of the projection lens. In addition, when a magnification varying function is added to the projection lens, a scanning angle needs to be changed as magnification is varied. This complicates system configuration.

Figure 11:
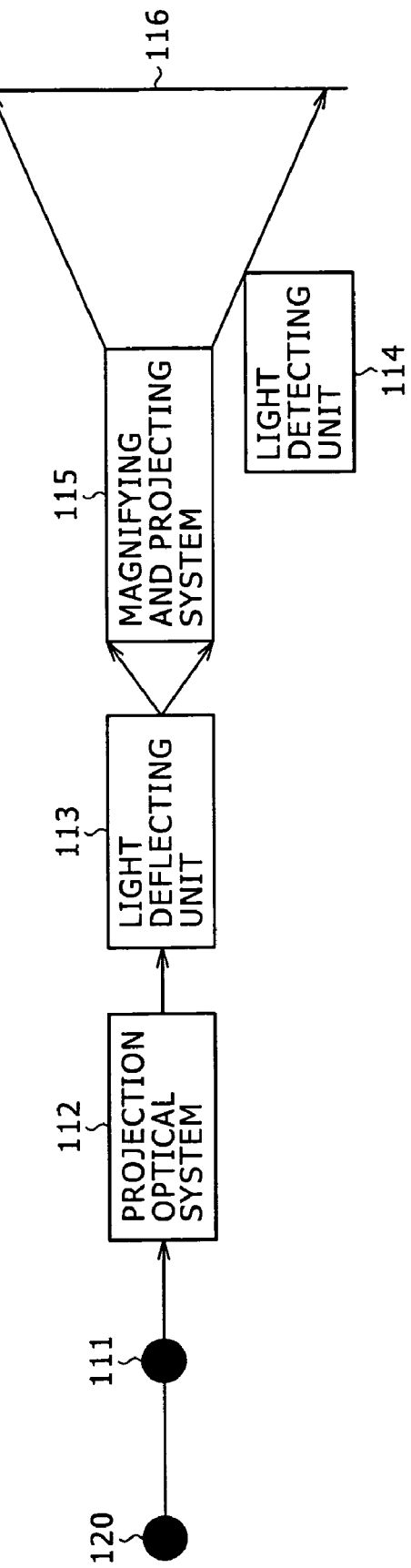
FIG. 11 is a block diagram showing an example of configuration of another image display apparatus different from the present invention.

As shown in FIG. 11, for example, when the magnifying and projecting system 115 is disposed between the light deflecting unit 113 and the light detecting unit 114 (when the light detecting unit 114 is disposed between the magnifying and projecting system 115 and the screen 116), the range of light emitted from the magnifying and projecting system 115 needs to be extended to the outside of an optical path of the light going toward to the screen 116. This leads to for example an increase in size and manufacturing cost of the magnifying and projecting system 115. In addition, this invites a decrease in detection accuracy due to a phenomenon referred to as so-called "shading," in which light is reflected at an edge part or the like of a lens and is not contained in a regular optical path, aberration, or the like.

Accordingly, as shown in FIG. 6, the image display apparatus 110 according to the embodiment of the present invention has the magnifying and projecting system 115 disposed between the light deflecting unit 113 and the screen 116, and the light detecting unit 114 disposed between the light deflecting unit 113 and the magnifying and projecting system 115. It is thereby possible to realize the apparatus in small size and at low cost, and measure modulation characteristics of the display element 111 with high accuracy.

The light detecting unit 114 includes an integrating sphere (optical sensor). The light detecting unit 114 receives and measures modulated light emitted from each pixel element of the display element (GLV) by the integrating sphere, obtains modulation characteristics, and detects for example nonuniformity of luminance and color displayed on the basis of variation in the modulation characteristics and illumination conditions.

The use of the integrating sphere when the modulation characteristics are measured makes it easier to control the light emitted from the display element 111 than using a linear detector, for example, and therefore eliminates the need for separately providing an optical system for image formation on the screen 116 and an optical system for image formation on the light detecting unit 114. Thus the apparatus can be configured simply. Incidentally, a detailed configuration of the light detecting unit 114 including the integrating sphere will be described later with reference to FIG. 12.

When an image is to be displayed on the screen 116, the light deflecting unit 113 reflects the light within the range of the optical path 117. When the modulation characteristics of the display element 111 are to be measured, the light deflecting unit 113 reflects the light toward the light detecting unit 114 situated outside the optical path 117.

Thus, the image display apparatus 110 can display an image on the screen 116, and measure the modulation characteristics of the display element 111 as required. In addition, by correcting a driving signal or the like on the basis of the detected modulation characteristics, the image display apparatus 110 can display a two-dimensional image with little degradation.

FIG. 12 is a diagram showing a more concrete example of the image display apparatus 110. In the figure, a light condensing optical system 213 for condensing light is disposed between the light source 120 and the display element 111 of the image display apparatus 110. The light condensing optical system 213 is provided to condense the light from the light source 120 and irradiate the display element 111 with the condensed light. Incidentally, while the light condensing optical system 213 is shown simply as a single lens in the figure, the light condensing optical system 213 has a composition for irradiating the display element 111 with a line-shaped beam along a direction of arrangement of the light modulating parts in the display element 111.

The projection optical system 112 is formed by a primary mirror 214 and a secondary mirror 215 constituting an Offner optical system. The direction of arrangement of the light modulating parts in the display element ill is defined as a Y-axis direction. The reflected light (or diffracted light) of the display element 111 is modulated by control means not shown in the figure on the basis of an image signal, and enters the unmagnification projection Offner optical system (the primary mirror 214 and the secondary mirror 215) under a telecentric condition. The Offner optical system emits the light to a scanning mirror 216 to be described later after reflecting the light three times.

The primary mirror 214 is in charge of a first reflection and a third reflection of the light from the display element 111. The primary mirror 214 is a concave mirror facing in a direction to approach the display element 111. The secondary mirror 215 is in charge of a second reflection of the light. The secondary mirror 215 is a convex mirror facing in a direction to approach the primary mirror 214. The light that has been applied from the light condensing optical system 213 to the display element 111 and has entered the Offner optical system is reflected first by the primary mirror 214 and reaches the secondary mirror 215. The light is reflected for a second time by the secondary mirror 215, and then goes to the primary mirror 214 again. Then, reflected for a third time by the primary mirror 214, the light goes to the scanning mirror 216.

The light deflecting unit 113 includes the scanning mirror 216 formed by a galvanomirror. The scanning mirror 216 as a mirror in the shape of a flat plate is provided to scan light on an X-Z plane (page surface in FIG. 12) perpendicular to the direction of arrangement (Y-axis direction) in the one-dimensional display element 111, for example, by being rotated by drive means (actuator and the like) not shown in the figure. While the luminous flux emitted from the Offner optical system to the scanning mirror 216 forms an unmagnified image by the display element 111, the light is scanned before the image is formed. When the display element 111 modulates the light on the basis of an image signal according to a scanning angle of the scanning mirror 216, a two-dimensional image formed by scanning a one-dimensional intermediate image in a direction orthogonal to a plane including the image, for example, is obtained.

When an image is to be displayed on the screen 116 as described above, the actuator sets the reference position of the scanning mirror 216 such that the light is reflected within the range of the optical path 117. When the modulation characteristics of the display element 111 are to be measured, the actuator sets the reference position of the scanning mirror 216 such that the light is reflected toward the light detecting unit 114 situated outside the optical path 117.

The two-dimensional image as intermediate image is further magnified and projected by the magnifying and projecting system 115. That is, after field curvature correction by a cylindrical lens group of three lenses (224 to 226), for the pupil position of a projection lens system 228 on the intermediate image side, a linear Fresnel element 227 performs correction for making directions of light rays coincide with each other (that is, for making the directions of the light rays coincide with an infinite direction) in the direction of arrangement in the display element 111 (Y-axis direction) and in an X-axis direction orthogonal to the Y-axis direction (corresponding to a light scanning direction). Thus, it suffices for the projection lens system 228 to have a function for simply magnifying the two-dimensional image. For example, it is possible to follow the specifications of a projection lens system designed for a two-dimensional display panel (display device) used in, for example, a liquid crystal type projector and the like and to apply the specifications as they are.

The light detecting unit 114 is formed by a condensing lens 231 and an integrating sphere 232. The condensing lens 231 is provided to condense light emitted from the scanning mirror 216 onto a light receiving part 232-1 of the integrating sphere 232. An optical sensor is provided within the integrating sphere 232. The light incident from the light receiving part 232-1 is reflected within the integrating sphere so as not to be leaked to the outside, all the incident light is collected, and the energy of the incident light, that is, the light quantity of the incident light is measured.

Thus, the image display apparatus 110 according to the embodiment of the present invention obviates the need for providing a reflecting mirror or the like for directing light to the light detecting unit 114 when the modulation characteristics of the display element 111 are to be measured. Therefore manufacturing cost is suppressed. In addition, the image display apparatus 110 obviates the need for the operation of attaching and detaching the reflecting mirror, for example, thus providing an increased convenience.

It is to be noted that FIG. 12 shows one example of concrete constitution of the image display apparatus 110, and that the image display apparatus 110 may thus be formed by a constitution other than the constitution shown in FIG. 12 as long as functional blocks corresponding to the respective functional blocks shown in FIG. 6 are arranged in similar arrangement positions shown in FIG. 6.

FIG. 13 is a diagram showing a detailed example of configuration of the light deflecting unit 113. In the figure, a galvanomotor 251 is provided as an actuator for driving the scanning mirror 216. The galvanomotor 251 is configured to be driven by a motor driving circuit 253 for generating a driving current on the basis of a signal generated by a motor controlling circuit 254. The scanning mirror 216 is fixed (connected) to a rotor magnet 273 as a rotary shaft of the galvanomotor 251, and is formed so as to rotate as the galvanomotor 251 is driven.

Figure 14:
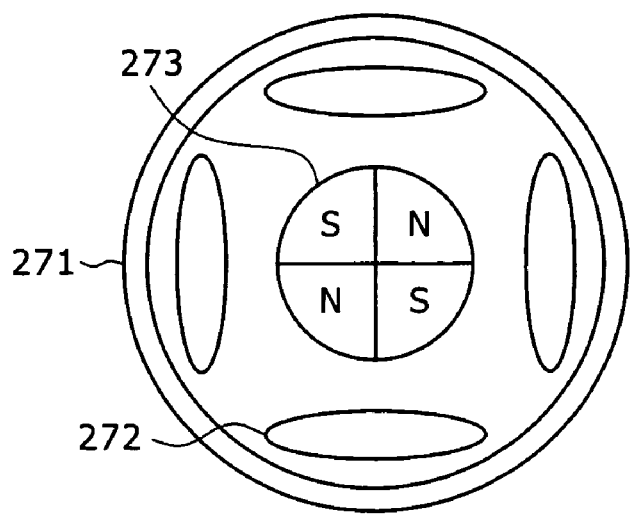
FIG. 14 is a sectional view of an example of structure of a galvanomotor.

The constitution and operation of the galvanomotor 251 will be described with reference to FIGS. 14 to 16. FIG. 14 is a schematic sectional view of the galvanomotor 251. As shown in the figure, the galvanomotor 251 has a fixed yoke 271 forming the periphery of the galvanomotor 251, the rotor magnet 273 formed so as to be rotatable with respect to the yoke 271, and four driving coils 272 fixed to the yoke 271.

The rotor magnet 273 in a cylindrical shape is the rotary shaft of the galvanomotor 251, and an end of the rotor magnet 273 is fixed to the scanning mirror 216, as described above. The rotor magnet 273, in section, is divided into four equal parts at angles of 90° with a center point in section as an axis. Each of an area of the four equal parts is magnetized so as to assume an S-polarity or an N-polarity, as represented by symbols "S" and "N" in the figure.

The driving coils 272 generate a magnetic field so as to assume the S-polarity or the N-polarity on the basis of a current input from the motor driving circuit 253. In this example, the four driving coils 272 are provided inside the yoke 271.

Figure 15:
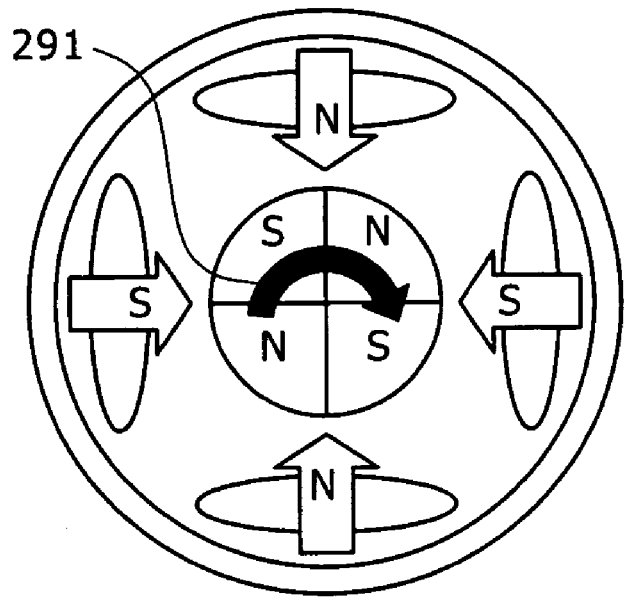
FIG. 15 is a diagram of assistance in explaining the operation of the galvanomotor.
Figure 16:
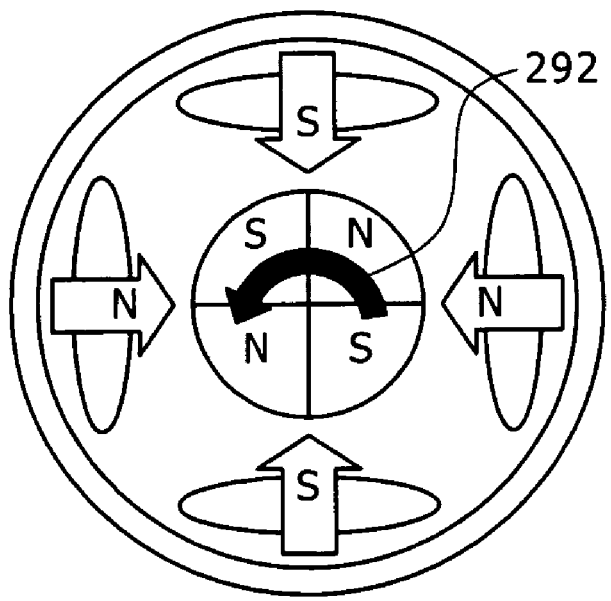
FIG. 16 is a diagram of assistance in explaining the operation of the galvanomotor.

For example, as shown in FIG. 15, when the four driving coils 272 each generate a magnetic field so as to assume the S-polarity or the N-polarity, the rotor magnet 273 rotates in a direction of an arrow 291 (in a clockwise direction in the figure) together with the scanning mirror 216. When the polarities of the driving coils 272 are reversed and the four driving coils 272 each generate a magnetic field as shown in FIG. 16, the rotor magnet 273 rotates in a direction of an arrow 292 (in a counterclockwise direction in the figure) together with the scanning mirror 216. Incidentally, if the rotor magnet 273 rotates 45° from the position shown in FIG. 15 or FIG. 16 in either a left direction or a right direction, the rotor magnet 273 does not generate torque (falls into a state at a so-called dead point) even when the polarities of the four driving coils 272 are reversed. Hence, the rotation range of the rotor magnet 273 is controlled to be less than 45° to each of the left and the right.

Thus, the galvanomotor 251 can rotate (scan) the scanning mirror 216 in a range of less than 45° to each of the left and the right. Incidentally, the mirror driven by the galvanomotor is referred to as a galvanomirror.

Returning to FIG. 13, an auxiliary motor 255 is provided under the galvanomotor 251. The auxiliary motor 255 is driven on a current generated by an auxiliary motor driving circuit 256. A rotary shaft of the auxiliary motor 255 is connected to the rotor magnet 273 of the galvanomotor 251. The auxiliary motor 255 further rotates the scanning mirror 216 together with the rotor magnet 273 on the basis of the current generated by the auxiliary motor driving circuit 256.

For example, when the image display apparatus 110 is to display an image on the screen 116, the auxiliary motor 255 is not driven, and the scanning mirror 216 is rotated by the galvanomotor 251 to reflect light in the optical path 117 toward the magnifying and projecting system 115. When the image display apparatus 110 is to measure the modulation characteristics of the display element 111, the auxiliary motor 255 is driven to rotate the rotor magnet 273 so that light reflected by the scanning mirror 216 goes to the condensing lens 231 in the light detecting unit 114, and thus the direction of the scanning mirror 216 is changed. That is, the image display apparatus 110 can change the reflection position of the light from the scanning mirror 216 as required by controlling the actuator (the galvanomotor 251 and the auxiliary motor 255) for driving the scanning mirror.

A rotary encoder 252 detects the rotation angle of the rotor magnet 273, and notifies a user of a direction in which the light reflected by the scanning mirror goes.

While the above description has been made of an example in which the auxiliary motor 255 is used as the actuator for changing the reflection position of the light from the scanning mirror 216 when the modulation characteristics of the display element 111 are to be measured, a hydraulic cylinder, a pneumatic cylinder, or the like may be used in place of the auxiliary motor 255. Further, a special mechanism (for example a mechanism that can change the reference position of the rotary shaft stepwise) may be incorporated into the galvanomotor 251 itself without the auxiliary motor 255 being used so that the reflection position of the light from the scanning mirror 216 can be changed.

Figure 17:
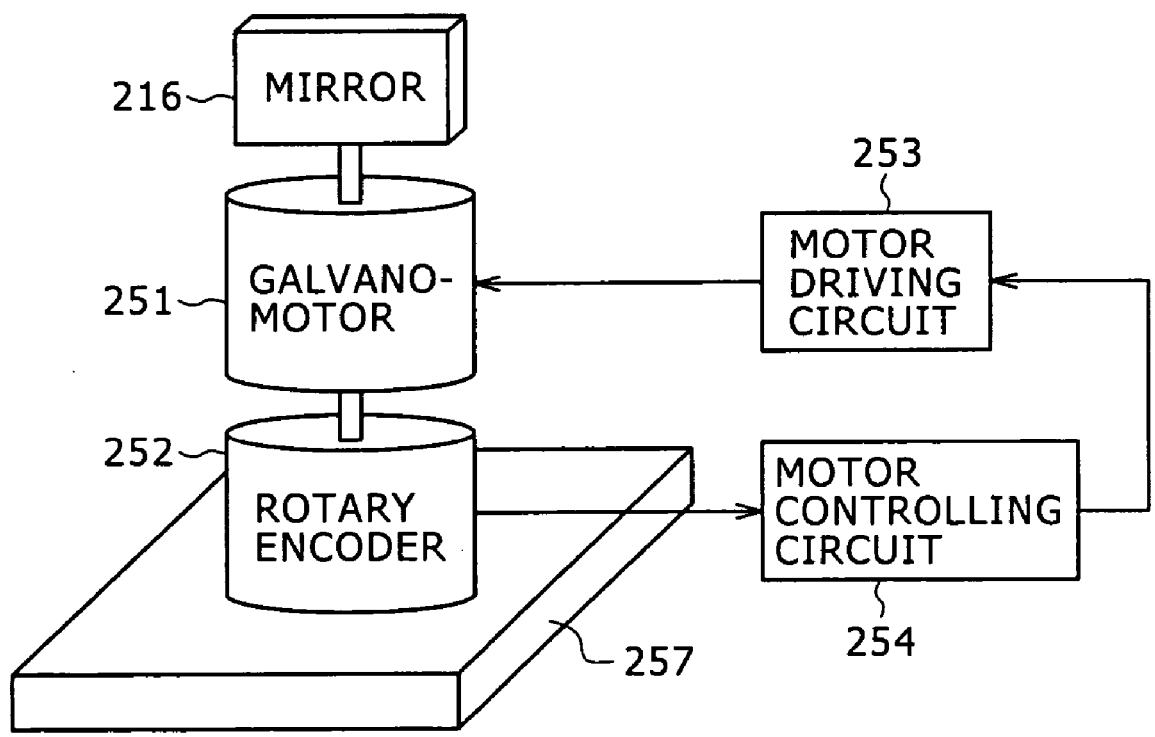
FIG. 17 is a diagram showing another concrete example of configuration of a light deflecting unit.

Alternatively, it is possible to change the reflection position of the light from the scanning mirror 216 by changing the direction of all the blocks constituting the light deflecting unit 113. FIG. 17 is a diagram showing an example of detailed configuration of the light deflecting unit 113 in this case.

In FIG. 17, parts corresponding to those of FIG. 13 are identified by the same reference numerals. In the example of FIG. 17, unlike the case of FIG. 13, the auxiliary motor 255 and the auxiliary motor driving circuit 256 are not provided, but a rotary base 257 for rotating a rotary encoder 252, a galvanomotor 251 fixed to the rotary encoder 252, and a scanning mirror 216 fixed to the galvanomotor 251 (a rotor magnet of the galvanomotor 251) is provided under the rotary encoder 252.

Thus, the image display apparatus 110 can change the reflection position of light from the scanning mirror 216 as required by controlling the driving of the rotary base 257.

While the above description has been made of an example of scanning of light by a galvanomirror, a resonant mirror that has a structure in which a relatively thick dielectric layer (titania layer or the like) having a high index of refraction is in contact with a prism with a relatively thin layer (silica layer or the like) having a low index of refraction interposed between the dielectric layer and the prism and which resonates light (evanescent wave) can be used in place of the galvanomirror.

Figure 18:
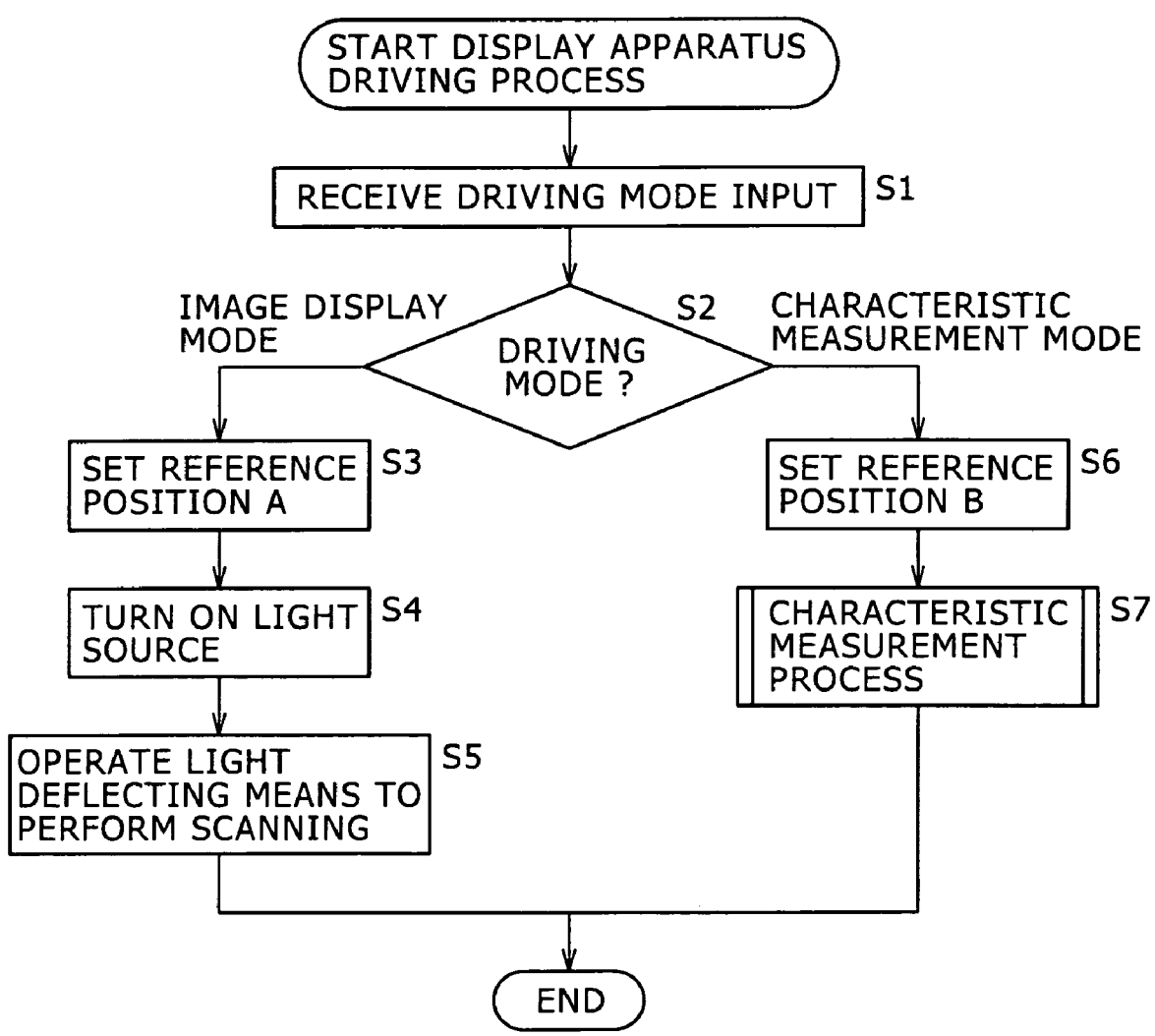
FIG. 18 is a flowchart of assistance in explaining a display apparatus driving process.

A driving process of the image display apparatus 110 will next be described with reference to a flowchart of FIG. 18.

In step S1, the image display apparatus 110 receives an input of a driving mode. There are two driving modes: an image display mode and a characteristic measurement mode. For example, one of the driving modes is specified by a user operating a switch, a button, or the like not shown in the figure, and information on the specified driving mode is transmitted to a control part of the auxiliary motor driving circuit 256 when the light deflecting unit 113 is formed as described above with reference to FIG. 13, for example.

In step S2, the image display apparatus 110 determines the driving mode received in step S1. When the image display apparatus 110 determines in step S2 that the driving mode is the image display mode, the process proceeds to step S3, where the light deflecting unit 113 sets a reference position A.

In this case, the reference position A is for example the position (angle) of the rotor magnet 273 when the scanning mirror 216 reflects light in the optical path 117 in the direction of the magnifying and projecting system 115. When the light deflecting unit 113 is formed as described above with reference to FIG. 13, the rotor magnet 273 is set at the reference position A by not driving the auxiliary motor 255.

In step S4, the image display apparatus 110 turns on the light source 120. Thereby modulated light is emitted from the display element 111. The light deflecting unit 113 receives the emitted light and reflects the light.

In step S5, the image display apparatus 110 operates the light deflecting unit 113 to perform scanning. For example, when the light deflecting unit 113 is formed as described above with reference to FIG. 13, the scanning mirror 216 is rotated by the galvanomotor 251, and reflects (scans) light in the optical path 117 in the direction of the magnifying and projecting system 115.

As a result, a two-dimensional image is displayed on the screen 116, as described above.

On the other hand, when the image display apparatus 110 determines in step S2 that the driving mode is the characteristic measurement mode, the process proceeds to step S6, where the light deflecting unit 113 sets a reference position B. In this case, the reference position B is for example the position (angle) of the rotor magnet 273 when the scanning mirror 216 reflects light onto the condensing lens 231 in the light detecting unit 114. When the light deflecting unit 113 is formed as described above with reference to FIG. 13, the rotor magnet 273 is set at the reference position B by driving the auxiliary motor 255.

Figure 20:
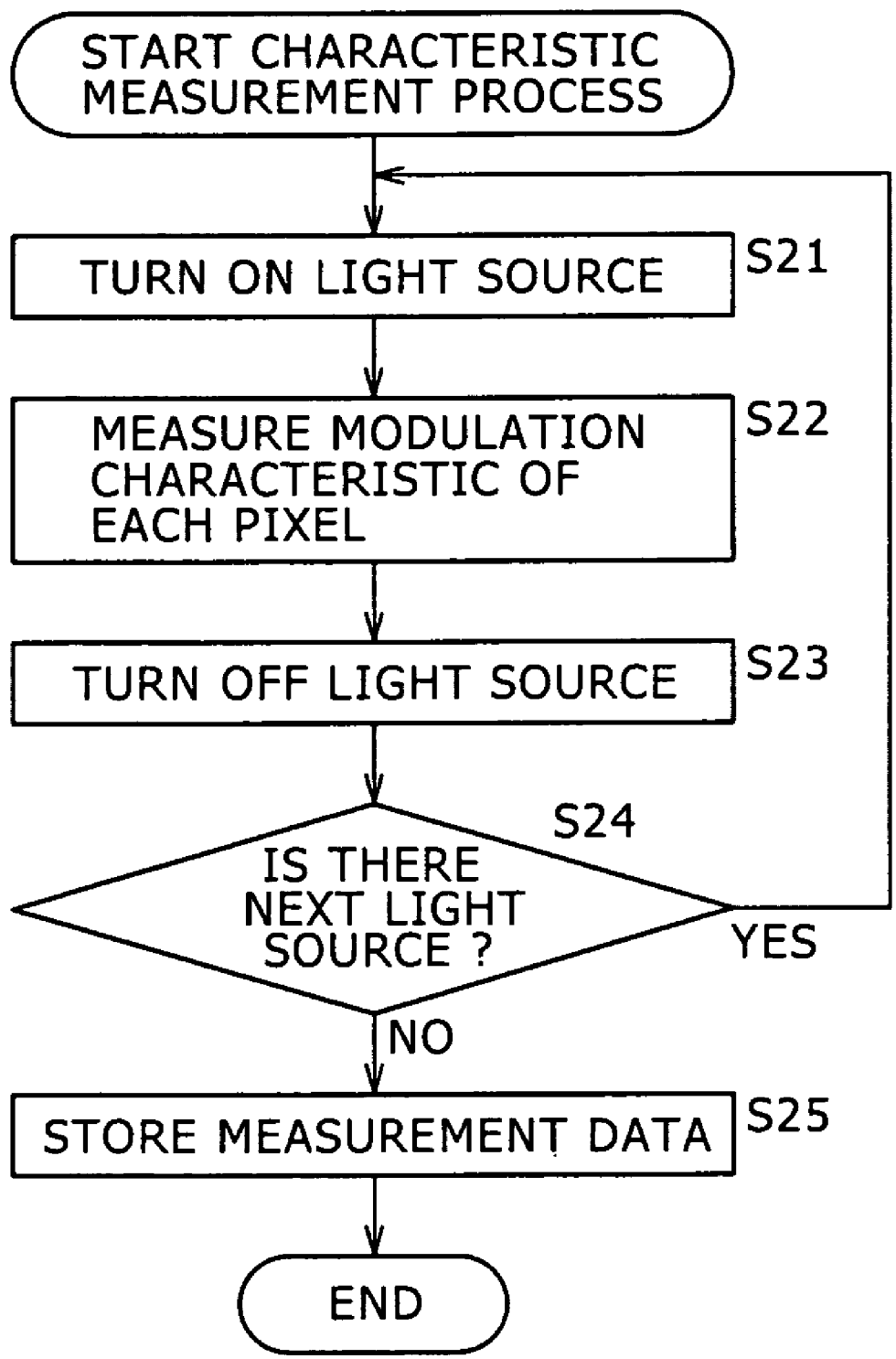
FIG. 20 is a flowchart of assistance in explaining a characteristic measurement process.

After the process of step S6, the light detecting unit 114 performs a characteristic measurement process to be described later with reference to FIG. 20 in step S7. Thereby the modulation characteristics of the display element 111 are measured.

Figure 19:
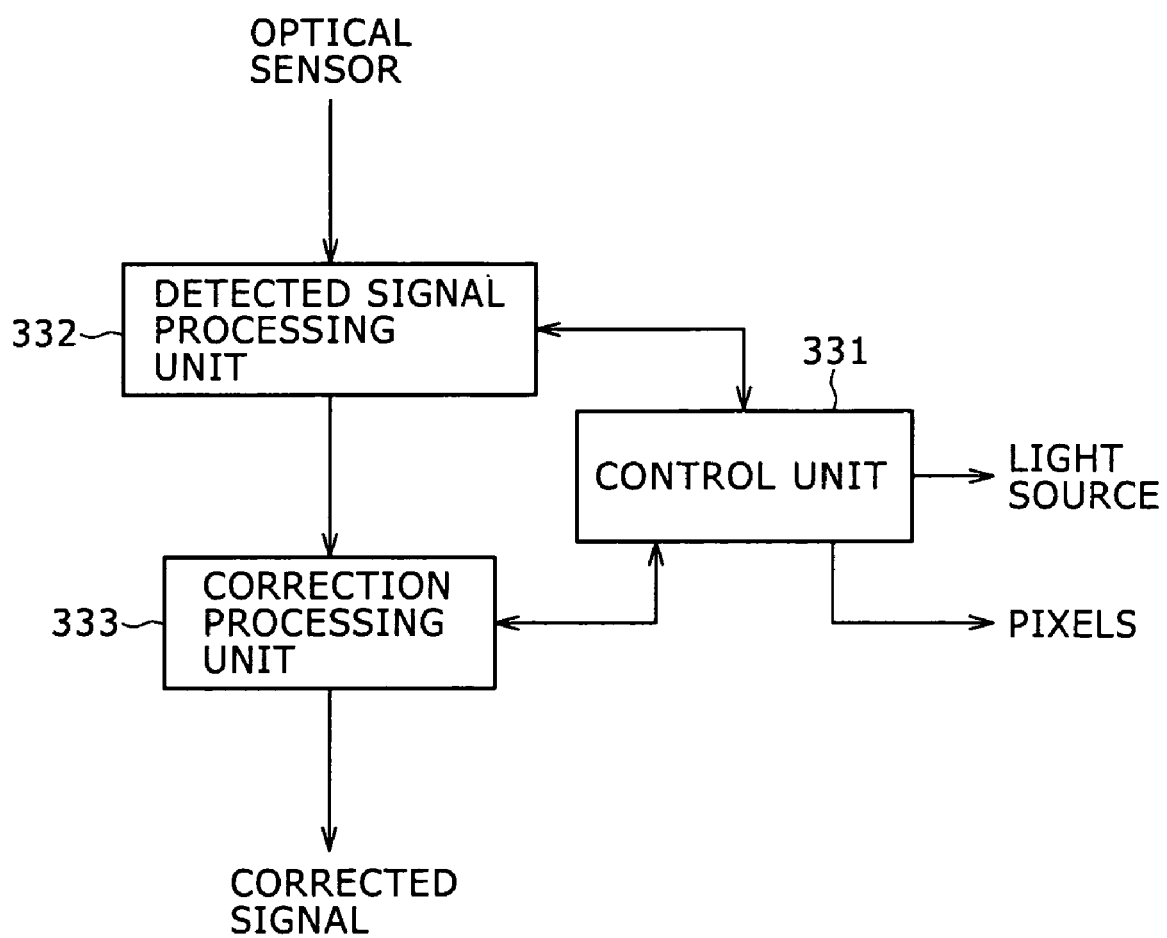
FIG. 19 is a block diagram showing an example of detailed configuration of a light detecting unit.

FIG. 19 is a block diagram showing an example of detailed configuration of the light detecting unit 114. In the figure, a control unit 331 controls parts constituting the light detecting unit 114, and makes the light source 120 and the pixels (pixels of the display element 111) driven as required.

A detected signal processing unit 332 has a gain adjusting circuit and an A/D converting circuit. The detected signal processing unit 332 performs initial processing on a modulated light signal from each pixel element measured by the optical sensor provided in the integrating sphere 232. For the detected modulated light signal, the gain adjusting circuit corrects difference in detection sensitivity of the optical sensor between laser light of different wavelengths emitted from an R laser light source, a G laser light source, and a B laser light source constituting the light source 120. The A/D converting circuit converts the detected signal after the correction into a digital signal. The converted detection data is sequentially stored in a memory or the like included in a correction processing unit 333.

The correction processing unit 333 has a memory, a correction value operation unit, and a data table storing unit. Light modulated by all pixel elements in an R, a G, and a B spatial light modulating element (GLV, for example) constituting the display element 111 is measured, and data obtained is stored in the memory. Thereafter the correction value operation unit for example determines the modulation characteristics of each pixel element using the measurement data of each pixel element, and determines an optimum driving voltage to be applied to each pixel element of each GLV with reference to a predetermined initial driving voltage so as to eliminate nonuniformity of luminance and color. A data table of the determined optimized driving voltage data is created, and stored in the data table storing unit. When an image is displayed, the driving signal after the correction which signal is stored in the data table storing unit is output as a corrected signal to the display element 111, and thereby the image is displayed.

Details of the characteristic measurement process in step S7 in FIG. 18 will next be described with reference to a flowchart of FIG. 20.

In step S21, the control unit 331 turns on one of the R, G, and B laser light sources constituting the light source 120 (for example the red (R) laser light source). The control unit 331 then makes the optical sensor provided within the integrating sphere 232 receive light that is emitted from one pixel forming the display element 111 and reaches the light detecting unit 114 via the projection optical system 112 and the light deflecting unit 113.

In step S22, the detected signal processing unit 332 measures the modulation characteristics of each pixel. At this time, the modulation characteristics of a pixel are measured as shown in FIGS. 21A and 21B, for example.

Figures 21A, 21B:
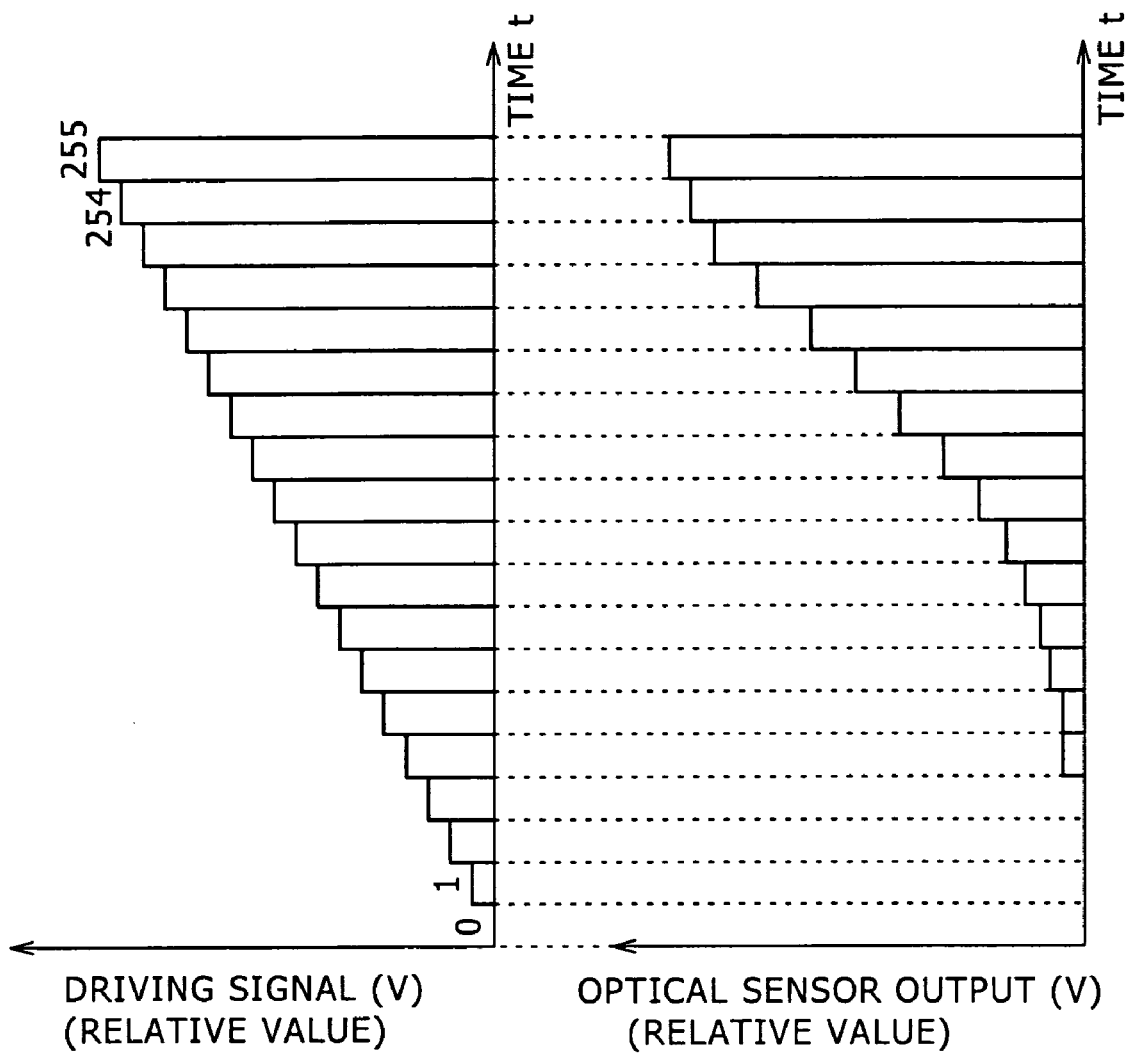
FIGS. 21A and 21B are diagrams showing an example of measurement of modulation characteristics.

In FIG. 21A, an axis of abscissas is time, and an axis of ordinates is driving signal voltage. FIG. 21A is a diagram showing the waveform of a test signal generated by the control unit 331 to measure modulation characteristics. As shown in the figure, the test signal is a so-called triangular signal that gradually changes the level (relative value) of the signal from zero to one, . . . , 254, and 255 with time. The pixel (element) to be measured is driven according to a driving signal that changes in level (relative value) from zero to one, . . . , 254, and 255, modulates incident laser light (for example red (R) laser light), and emits modulated light including diffracted light having an intensity corresponding to each level.

Then, the emitted modulated light enters the optical sensor provided in the integrating sphere 232. The detected signal processing unit 332 measures the intensity of the modulated light on the basis of a signal output from the optical sensor, converts the measured intensity of the modulated light into an electric signal, and then outputs the electric signal.

FIG. 21B shows the level of an output signal corresponding to the intensity of the modulated light measured by the optical sensor, which level corresponds to each level of the applied test signal, that is, FIG. 21B shows so-called modulation characteristics. As shown in the figure, while the voltage value of the test signal changes linearly, the intensity of the modulated light does not change linearly. When the level of the driving voltage is low, the intensity of the modulated light is zero, and when the level of the driving voltage exceeds a certain value, the intensity of the modulated light increases sharply.

Figure 22:
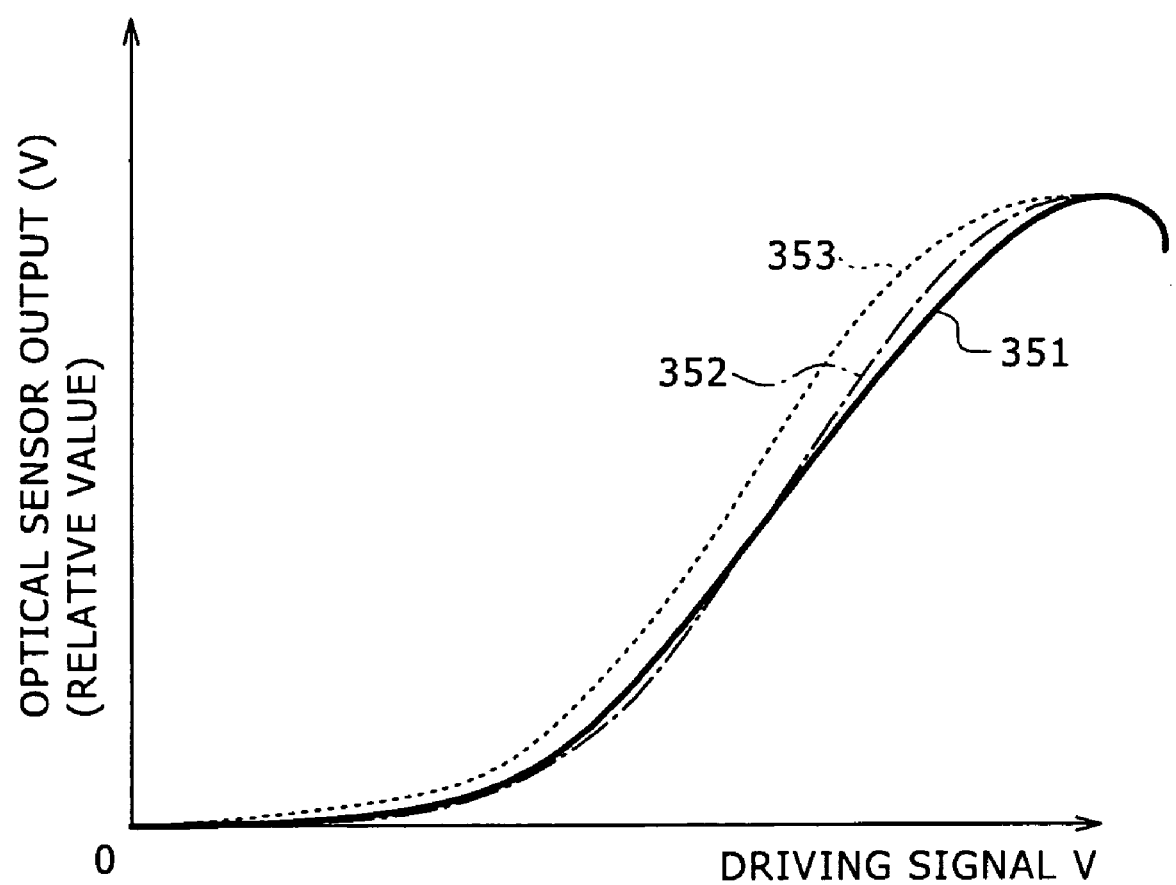
FIG. 22 is a diagram showing an example of results of measurement of modulation characteristics of pixels.

The modulation characteristics of each pixel are thus measured, and thereby measurement results as shown in FIG. 22, for example, are obtained. FIG. 22 is a graph showing the modulation characteristics of three pixels, for example. In FIG. 22, an axis of abscissas indicates driving voltage (the voltage of the test signal), and an axis of ordinates indicates the output of the optical sensor. In the figure, a curved line 351 for example represents the modulation characteristics of an Lth pixel, a curved line 352 for example represents the modulation characteristics of an Mth pixel, and a curved line 353 for example represents the modulation characteristics of an Nth pixel. It is to be noted that while the modulation characteristics of the three pixels are shown in this example, the modulation characteristics of all pixels are measured in practice.

Returning to FIG. 20, in step S23, the control unit 331 turns off the light source turned on by the process of step S21.

In step S24, the control unit 331 determines whether there is a next light source. In this case, the green (G) laser light source and the blue (B) laser light source have not yet been turned on, and therefore the control unit 331 determines in step S24 that there is a next light source. The process returns to step S21 to repeat the process from step S21 on down.

After the green (G) laser light source and the blue (B) laser light source are sequentially turned on in step S21, and sequentially turned off in step S23, the control unit 331 determines in step S24 that there is no next light source. The process proceeds to step S25, where the correction processing unit 333 stores measurement data based on the modulation characteristics of each pixel.

The modulation characteristics of the display element 111 are thus measured.

Thus, the image display apparatus 110 according to the embodiment of the present invention can easily display an image or measure modulation characteristics without a reflecting mirror or the like in particular being inserted or removed, and thus efficiently measure the modulation characteristics of the display element.

The series of processes described above can be carried out by hardware and by software.

The steps for carrying out the series of processes described in the present specification include not only processes carried out in time series in the described order but also processes carried out in parallel or individually and not necessarily in time series.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising:
   a spatial light modulating element formed with a plurality of light modulating elements for each modulating light from a light source, said light modulating elements being arranged in a row or a plurality of rows;
   a projection optical system for forming a first image on a basis of the light modulated by said spatial light modulating element;
   light deflecting means for forming a second image by reflecting said first image formed by said projection optical system so as to scan said first image in a direction orthogonal to a longitudinal direction of said first image, said longitudinal direction of said first image being a longer direction of said first image;
   a magnifying and projecting system for magnifying said second image and projecting said second image on a screen; and
   detecting means for detecting intensity of the light modulated by said spatial light modulating element and reflected by said light deflecting means via said projection optical system, said detecting means being disposed at a position that the light reflected from said light deflecting means enters without passing through said magnifying and projecting system, said position being off an optical path of the light going from said light deflecting means to said magnifying and projecting system; wherein
   when said second image is projected on said screen, said light deflecting means reflects said first image toward said magnifying and projecting system so as to scan said first image in the direction orthogonal to the longitudinal direction of said first image, and when the intensity of the light modulated by said spatial light modulating element is detected, said light deflecting means reflects the light from said projection optical system toward said detecting means.

2. The image display apparatus as claimed in claim 1, wherein said light deflecting means reflects the light in one of two ranges.

3. The image display apparatus as claimed in claim 1, wherein said light deflecting means is formed by a galvanomirror.

4. The image display apparatus as claimed in claim 1, wherein when said second image is projected on said screen, said light deflecting means reflects said first image toward said magnifying and projecting system so as to scan said first image in the direction orthogonal to the longitudinal direction of said first image on a basis of a first reference position, and when the intensity of the light modulated by said spatial light modulating element is detected, said light deflecting means reflects the light as said first image from said projection optical system toward said detecting means on a basis of a second reference position.

5. The image display apparatus as claimed in claim 4, further comprising driving means for driving said light deflecting means so as to change between said first reference position and said second reference position.

6. The image display apparatus as claimed in claim 1, wherein said detecting means is formed by an integrating sphere.

7. The image display apparatus as claimed in claim 1, wherein said spatial light modulating element is formed with a plurality of said light modulating elements arranged in a row, and
   said projection optical system forms a one-dimensional image as said first image on the basis of the light modulated by said spatial light modulating element.

8. An image display method of an image display apparatus, said image display apparatus including a spatial light modulating element formed with a plurality of light modulating elements for each modulating light from a light source, said light modulating elements being arranged in a row or a plurality of rows, a projection optical system for forming a first image on a basis of the light modulated by said spatial light modulating element, light deflecting means for forming a second image by reflecting said first image formed by said projection optical system so as to scan said first image in a direction orthogonal to a longitudinal direction of said first image, said longitudinal direction of said first image being a longer direction of said first image, a magnifying and projecting system for magnifying said second image and projecting said second image on a screen, and detecting means for detecting intensity of the light modulated by said spatial light modulating element and reflected by said light deflecting means via said projection optical system, said detecting means being disposed at a position that the light reflected from said light deflecting means enters without passing through said magnifying and projecting system, said position being off an optical path of the light going from said light deflecting means to said magnifying and projecting system, said image detecting method comprising the steps of:
   reflecting said first image toward said magnifying and projecting system so as to scan said first image in the direction orthogonal to the longitudinal direction of said first image when said second image is projected on said screen; and
   reflecting the light from said projection optical system toward said detecting means when the intensity of the light modulated by said spatial light modulating element is detected.

9. A driving apparatus for driving light deflecting means for forming a second image by reflecting light of a first image formed by a projection optical system for forming said first image on a basis of light modulated by a spatial light modulating element formed with a plurality of light modulating elements arranged in a row or a plurality of rows so as to scan the light of said first image in a direction orthogonal to a longitudinal direction of said first image, said longitudinal direction of said first image being a longer direction of said first image, said driving apparatus driving said light deflecting means so as to make said light deflecting means reflect said first image toward a magnifying and projecting system for magnifying said second image and projecting said second image on a screen so as to scan said first image in the direction orthogonal to the longitudinal direction of said first image on a basis of a first reference position when said second image is projected on said screen, and said driving apparatus driving said light deflecting means so as to make said light deflecting means reflect the light from said projection optical system toward detecting means for detecting intensity of the light, said detecting means being disposed at a position off an optical path of the light going from said projection optical system to said magnifying and projecting system, on a basis of a second reference position when the intensity of the light modulated by said spatial light modulating element is detected.

10. The driving apparatus as claimed in claim 9, wherein said driving apparatus drives said light deflecting means including a mirror for reflecting the light from said projection optical system.

11. The driving apparatus as claimed in claim 10, further comprising:

first driving means for driving said mirror such that the light reflected from said mirror is scanned in the direction orthogonal to the longitudinal direction of said first image; and auxiliary driving means for driving said light deflecting means so as to change a reference position of said light deflecting means to one of said first reference position and said second reference position.

12. The driving apparatus as claimed in claim 11, further comprising driving control means for controlling the driving of said auxiliary driving means.

13. The driving apparatus as claimed in claim 9, wherein said light modulating elements are arranged in one row, and said projection optical system forms a one-dimensional image as said first image on the basis of the light modulated by said spatial light modulating element.

14. A driving method of a driving apparatus for driving light deflecting means for forming a second image by reflecting light of a first image formed by a projection optical system for forming said first image on a basis of light modulated by a spatial light modulating element formed with a plurality of light modulating elements arranged in a row or a plurality of rows so as to scan the light of said first image in a direction orthogonal to a longitudinal direction of said first image, said longitudinal direction of said first image being a longer direction of said first image, said driving method comprising the steps of:

making said light deflecting means reflect said first image toward a magnifying and projecting system for magnifying said second image and projecting said second image on a screen so as to scan the first image in the direction orthogonal to the longitudinal direction of said first image on a basis of a first reference position when said second image is projected on said screen; and making said light deflecting means reflect the light from said projection optical system toward detecting means for detecting intensity of the light, said detecting means being disposed at a position off an optical path of the light going from said projection optical system to said magnifying and projecting system, on a basis of a second reference position when the intensity of the light modulated by said spatial light modulating element is detected.

* * * * *